United States Patent [19]

Hench et al.

[11] 4,421,716
[45] Dec. 20, 1983

[54] SAFETY MONITORING AND REACTOR TRANSIENT INTERPRETER

[75] Inventors: John E. Hench; Tom Y. Fukushima, both of San Jose, Calif.

[73] Assignee: S. Levy, Inc., Campbell, Calif.

[21] Appl. No.: 221,327

[22] Filed: Dec. 29, 1980

[51] Int. Cl.³ .............................................. G21C 7/36
[52] U.S. Cl. .................................. 376/216; 376/207; 376/217; 364/527
[58] Field of Search ............... 376/217, 207, 215, 216; 364/504, 518, 521

[56] References Cited

U.S. PATENT DOCUMENTS

| | | | |
|---|---|---|---|
| 3,142,820 | 7/1964 | Daniels | 340/172.5 |
| 3,581,289 | 5/1971 | Wilhelm et al. | 340/172.5 |
| 3,585,603 | 6/1971 | Ross et al. | 340/172.5 |
| 3,741,246 | 6/1973 | Braytenbah | 137/624.11 |
| 3,886,332 | 5/1975 | Petit et al. | 235/151.21 |
| 3,971,000 | 7/1976 | Cromwell | 340/172.5 |
| 4,080,251 | 3/1978 | Musick | 376/217 |
| 4,236,220 | 11/1980 | Kogami | 376/217 |
| 4,292,129 | 9/1981 | Barry | 376/217 |

Primary Examiner—Donald P. Walsh
Attorney, Agent, or Firm—Owen L. Lamb

[57] ABSTRACT

An apparatus which monitors a subset of control panel inputs in a nuclear reactor power plant, the subset being those indicators of plant status which are of a critical nature during an unusual event. A display (10) is provided for displaying primary information (14) as to whether the core is covered and likely to remain covered, including information as to the status of subsystems needed to cool the core and maintain core integrity. Secondary display information (18, 20) is provided which can be viewed selectively for more detailed information when an abnormal condition occurs. The primary display information has messages (24) for prompting an operator as to which one of a number of pushbuttons (16) to press to bring up the appropriate secondary display (18, 20). The apparatus utilizes a thermal-hydraulic analysis to more accurately determine key parameters (such as water level) from other measured parameters, such as power, pressure, and flow rate.

6 Claims, 15 Drawing Figures

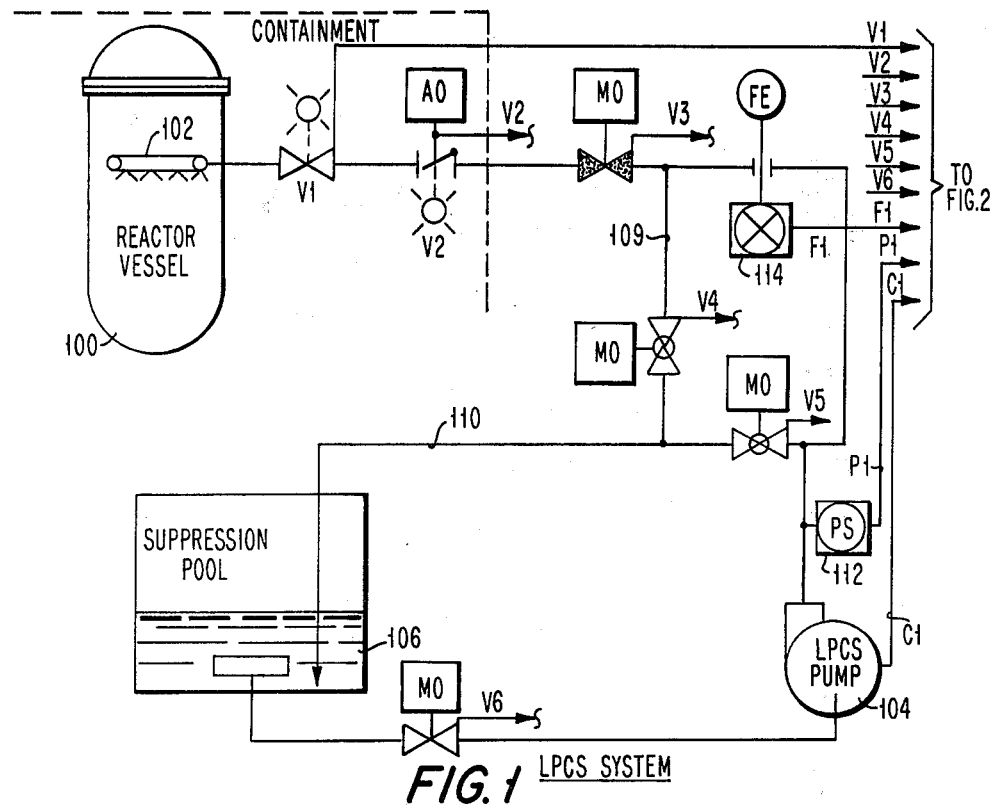
FIG.1 LPCS SYSTEM
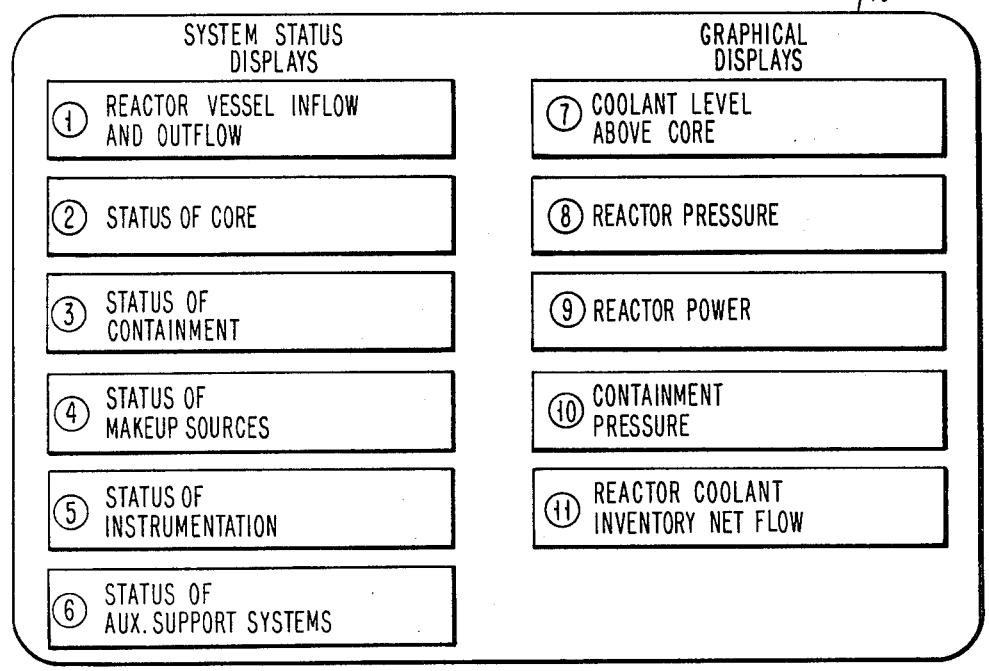
FIG.3

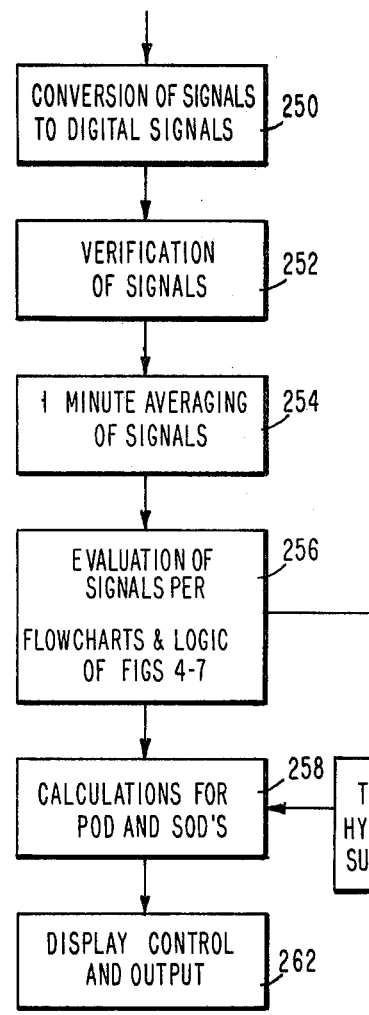
FIG 8
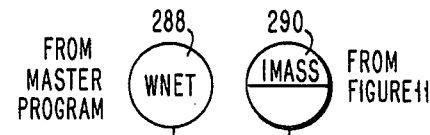
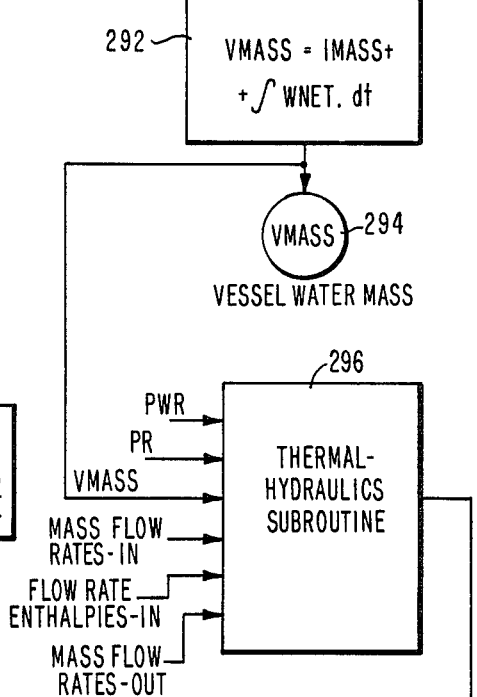
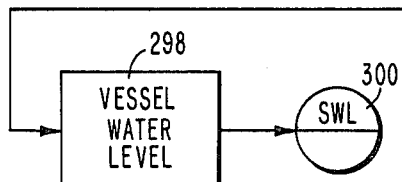
FIG.10

SAFETY MONITORING AND REACTOR TRANSIENT INTERPRETER

DESCRIPTION

1. Technical Field

The present invention relates to fault detection apparatus for monitoring a process plant, such as a nuclear power plant, in order to make critical information available to its operator during abnormal events.

2. Background Art

One of the lessons to be learned from the incident at the Three-Mile Island Nuclear Station on Mar. 28, 1979, is that nuclear power plants should be designed to provide information to the operator in an easily assimilated form in order to cope with abnormal events which have not been previously analyzed or experienced. In a report on the incident at Three-Mile Island entitled "Staff Report on the General Assessment of Feed Water Transients in PWRs Designed by B&W" dated May 1979 (NUREG-0560), the Nuclear Regulatory Commission stated:

"There will always be a residium of possible but not postulated and analyzed situations. To address this, and as an attempt to extend the defense-in-depth concept, we should study ways to make the operator a more effective recovery agent for incident/accident mitigator. Such a study should look for ways to (a) prevent (inhibit) inappropriate actions, and (b) promote productive intervention. An element of the study that could serve both purposes would be an investigation of methods that would furnish the operator with correct, current, digestible information regarding prinicipal plant conditions (i.e., processes, systems, and equipment). The means by which the operator would best use this information should also be considered, however, such means should not be so rigid as to preclude expedited and improvised actions for the operators for unanticipated phenomena."

A primary object of the present invention is to provide an apparatus for monitoring critical systems of a nuclear (process) plant and to provide information as to the status thereof, in summary form, to a plant operator.

DISCLOSURE OF THE INVENTION

Briefly, the above object is accomplished in accordance with the invention by providing an apparatus which monitors a subset of control panel inputs, the subset being those indicators or plant status which are of a critical nature during an unusual event;

Displaying primary information as to whether the core is covered and likely to remain covered, including information as to the status of systems needed to cool the core and maintain core integrity; and, providing a secondary display which can be viewed selectively for more detailed information when an abnormal condition occurs, the primary display having means for prompting the operator as to which one of a number of pushbuttons to press to bring up the appropriate secondary display.

In accordance with an aspect of the present invention an apparatus is provided which will make information available to the operator in the essential area of reactor core water inventory by keeping a continuous tally of all outflow and inflow to the reactor pressure vessel, and converting these flows of water level relative to the top of the reactor core.

In accordance with an aspect of this invention information is provided to the operator as to whether the water level is rising or dropping, and how much time remains before the core will become uncovered if the water level continues to drop at its current rate.

In accordance with an aspect of the invention, a means is provided by which the operator can obtain information as to the status of crucial systems upon request.

In accordance with an aspect of the invention information is provided in a summary form to the operator, as opposed to providing information as to the status of the entire system.

In accordance with an aspect of the invention, means are provided to monitor a number of reactor systems to make available critical information as to water inventory, power level status, and containment status, and to display this critical information in summary form.

In accordance with an aspect of the invention, a backup system calculates the reactor vessel water level based upon an analytical model of the reactor vessel and core. The model involves inflows and outflows of water to the reactor vessel, reactor power, reactor pressure, and reactor water mass. In order to improve the model accuracy, the data is reset periodically during normal operation while the monitor is in standby mode so that the calculated water level is consistent with the actual level as indicated by the directly measured process instrumentation level meters.

BRIEF DESCRIPTION OF THE DRAWINGS

FIG. 1 is a simplified piping and instrumentation diagram for a low pressure core spray system in a Boiling Water Reactor (BWR) power plant;

FIG. 3 is a diagram of the pushbutton selector panel associated with the safety monitor CRT display shown in FIG. 2;

FIG. 8 is a flowchart of the master program and the thermal-hydraulics program subroutine thereof;

FIG. 10 is a flowchart of the procedure using the thermal-hydraulics program in the water level calculating mode;

DESCRIPTION OF THE PREFERRED EMBODIMENT OF THE INVENTION

Figure 2:
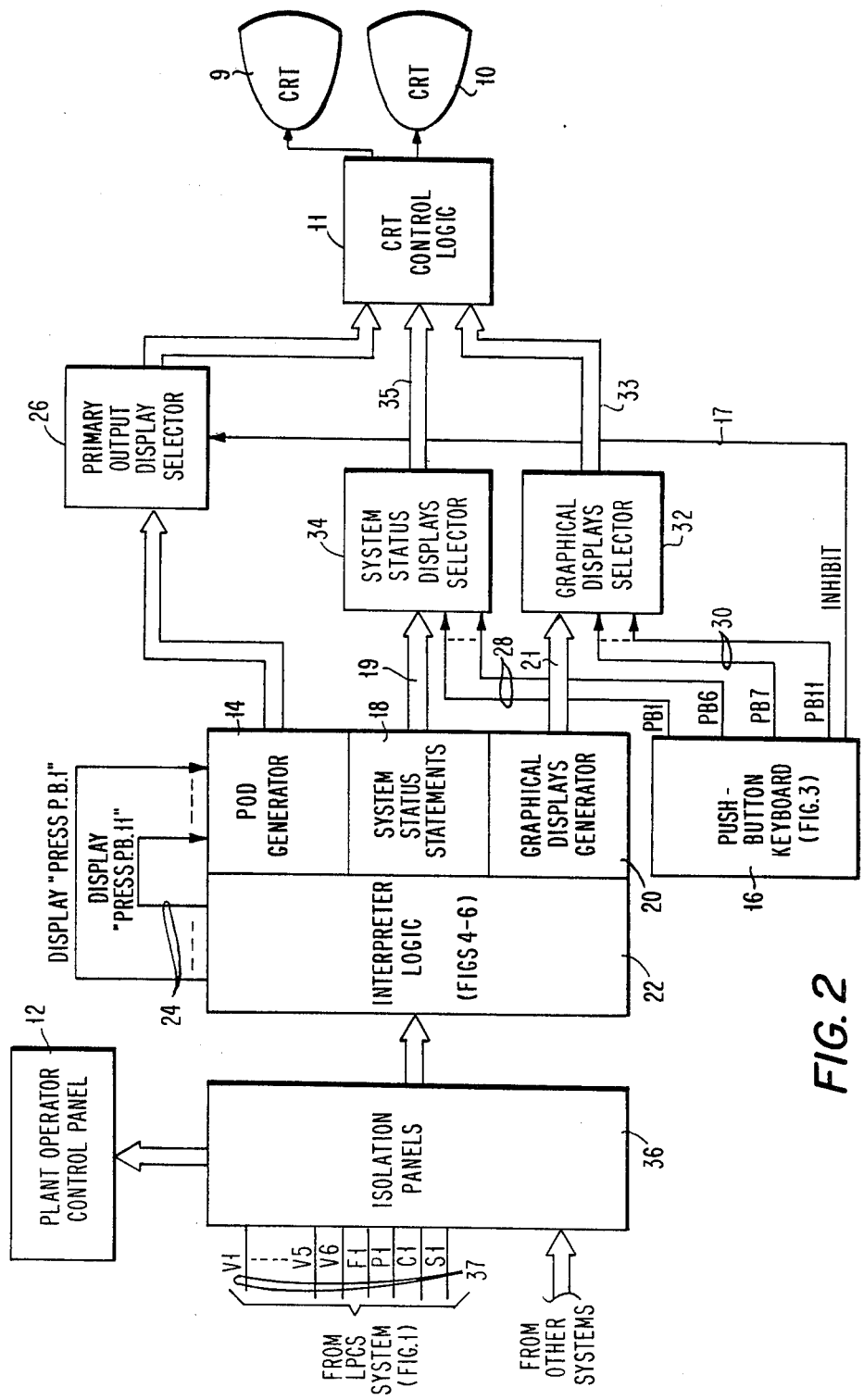
FIG. 2 is an overall block diagram of the nuclear reactor safety monitor in which the present invention is embodied.

The present invention is embodied in a Boiling Water Reactor (BWR) nuclear power plant. The reactor is basically a water boiler, and therefore process systems are required a water boiler, and therefore process systems are required which clean and control the chemistry of the water in the reactor vessel as well as to provide protection for the reactor core. These systems may be divided into two general categories: those systems necessary for normal nuclear boiler operations, including startup and shutdown; and those systems which accommodate or provide backup in case of an abnormal or accident condition.

Systems used during normal plant operation include the reactor water cleanup system, the fuel and containment pools cooling and filtering system, the closed cooling water system for reactor services, and the shutdown cooling function of the residual heat removal system. The reactor water cleanup system provides continuous purification of the reactor coolant to control the concentration level of long half-life fission products and activation products. The shutdown function of the residual heat-removal system removes heat during reactor shutdown and prior to refueling.

Backup systems used during abnormal or accident plant operation include the reactor core isolation cooling system, the standby liquid control system, the steam condensing function of the residual heat removal (RHR) system and the suppression pool cooling function of the RHR system. Further process systems, referred to as emergency core cooling systems, are safety systems which are brought into action during emergency situations that could otherwise lead to core damage and release of fission products to the environment. These systems consist of the low pressure coolant injection function of the RHR system, the high pressure and low pressure core spray systems, and automatic depressurization. A more detailed description of a boiling water reactor can be found in the following publication: "The Thermal-Hydraulics of a Boiling Water Nuclear Reactor," *American Nuclear Society*, 1977, by R. T. Lahey, Jr. and F. J. Moody.

The purpose of the safety monitor of the present invention is to provide summary information which informs a nuclear power plant operator of the status of the cooling water inventory of each of the above-described systems needed to keep the reactor core cool. In this regard, the monitor performs two basic functions: it tells the operator if the core is covered and if it is likely to remain covered; and it informs the operator in simple terms of the status of each of the systems needed to cool the core and maintain core integrity. The monitor performs the above functions by taking raw data from the plant instrumentation, such as flowmeters, and valve position indicators, and processing this information through an interpreter logic. The function of the interpreter logic is to integrate and analyze the information available and to inform the operator of the status of critical systems by means of a visual display so that the operator can take the best action to protect the core in the event of an emergency. The monitor is operational at all times; however it is not intended for use during normal operation of the plant, nor does it replace the instrumentation on the operator control panel. It is most effective when the number of signals or alarms on the main control panel are so great as to potentially confuse the operator. In such a situation, the operator can refer to the monitor for essential safety information to use in determining the proper action to take in an emergency. Once the operator has consulted the monitor for guidance needed to interpret the signals on the main control panel, the monitor's interpretation can be verified by the operator by checking the appropriate instruments on the main control panel.

Referring now to FIG. 2, the operator receives information from the monitor by means of cathode ray tube (CRT) displays (9, 10) which has a pushbutton keyboard (16) which is used to call up the desired display on the CRT screen. The pushbutton keyboard is shown in more detail in FIG. 3. The CRT and selector are located in the main control room near the plant operator control panel (12).

A primary output display (POD) is generated by means of the POD generator (14) and is continuously displayed on one of the CRT screens (9). The operator can select a number of secondary output displays (SOD) by depressing a selector pushbutton (16). The secondary output displays include system status statements and graphical trend displays which are generated by generators 18 and 20, respectively. A secondary output display remains displayed on the second CRT screen (10) as long as the operator desires.

Table 1 shows the POD data which is displayed normally on one CRT screen. Items in the trend column are displayed only when a rate change is in progress.

Table 2 shows a listing of all the statements available for display as generated by the system status statement's generator (18). The SOD data is displayed when the operator depresses one of the pushbuttons shown in FIG. 3.

Pushbuttons 1 through 6 call up system status displays and pushbuttons 7 through 11 call up graphical trend displays. The system status displays show abnormal or accident conditions that may exist in critical systems related to core cooling. The graphical displays show the trend of selected parameters, during a given time period, graphically on a timebase display. The POD on the CRT screen shows which of the pushbuttons to depress when an abnormal or accident condition occurs by means of a prompt message (such as "Press pushbuttons 1 and 4").

The interpreter logic (22) receives data from plant instrumentation and processes the data to make available the displayed output information. Specified limits on selected variables are determined by the logic, and a flashing display or a change of color in the display is initiated for certain out-of-limit parameters. Other parameters are only made available for display when an out-of-limit condition exists and are suppressed when conditions are normal. Plant-system valve lineups and pump arrangements are checked for correctness under the prevailing plant conditions and a display message is generated when an abnormal condition exists. When such a condition occurs, the interpreter hardware logic energizes one of the lines (24) to thereby instruct the primary output display generator logic (14) to display on the screen, along with the normally-displayed information, the prompt message "press pushbutton XX". This message informs the operator that further information can be obtained by depressing one of the pushbuttons (16) as called out on the POD.

When one of the pushbuttons on the keyboard (16) is depressed, an inhibit line (17) from the keyboard (16) is energized to deselect the primary output display which normally passes through the POD selector (26). If one of the pushbuttons in the group of pushbuttons 1–6 is depressed, then one of the output lines (28) from keyboard (16) is energized. The appropriate output (19) for one of the group of statements from generator (18) is then selected by means of the system status displays selector (34). The output (35) of the selector passes to the CRT control logic (11) where it is processed and brought up on the CRT screen.

Similarly, if one of the pushbuttons in the group of pushbuttons 7-11 is depressed, then one of the output lines (30) from the keyboard (16) is energized. The appropriate output (33) for one of the graphical displays from generator (20) is then selected by means of the graphical displays selector (32). The output of the selector (33) passes to the CRT control logic (11) where it is processed and brought up on the CRT screen.

The following paragraphs describe how the interpreter monitors ten reactor systems in order to obtain essential information and how the interpretor analyzes this information. One of the systems, the low pressure core spray system (LPCS), is then described in detail to illustrate how the hardware logic within the interpreter logic (22) of FIG. 2 is implemented in accordance with the teachings of the present invention. The remaining nine systems are not described in detail.

REACTOR VESSEL INFLOW SOURCES

The interpreter logic must continually monitor outflow from the reactor vessel (100) and inflow to the vessel to calculate the net water inventory. The flow of coolant into the reactor is determined as described below for each of the systems that contribute to inflow:

Feedwater

The feedwater system has a flowmeter designed for use during normal operation. The flow signal from this flowmeter is combined with on/off signals from the pumps in the feedwater string to provide extra assurance that the indicated flow is correct. As a backup flow measurement, the pump suction flowmeters are combined to determine flow rate.

Control Rod Drive (CRD) Cooling Water

This source of water is estimated from the cooling water flow element, backed up by secondary flow element plus pump motor current and valve position.

HPCS and RCIC

The high pressure core spray system (HPCS) and the reactor core isolation cooling system (RCIC) flow rate are determined by a flow element, backed up by flow estimated from startup test data, correlated with reactor vessel pressure, pump status, and the position of valves in the system.

RHR and LPCS

The residual heat removal system (RHR) has two modes for pumping water into the reactor pressure vessel at low pressure: the shutdown cooling mode and the low pressure coolant injection (LPCI) mode. In the shutdown cooling mode, the water is injected into the feedwater line. In the LPCI mode, the coolant is injected directly into the core region through special penetrations. Low pressure core spray (LPCS) is injected into the vessel through one of the core spray spargers. The RHR and LPCS flow rates are measured with a flowmeter. The signal from the flowmeter is combined with valve position signals to determine the flow rate into the vessel. This flow rate is checked by estimating the RHR and LPCS flow rate based on reactor vessel pressure, the number of pumps, operating and the position of the valves. Any significant deviation between the measured and estimated RHR and LPCS flow rate is brought to the operator's attention on the CRT screen.

Reactor Water Cleanup (RWCU)

The reactor water cleanup (RWCU) system is a continuously-operating system which takes suction from the reactor vessel; cools, filters, and demineralizes the water; then heats it and returns it to the feedwater loop. Under normal circumstances, the outflow and inflow are exactly equal, and the net inflow is therefore zero. However, because there are alternate paths for makeup, letdown, backflushing, etc., it is possible for the RWCU system to have a net inflow or outflow to the reactor vessel, depending on valve alignment. The interpreter estimates the net inflow or outflow based on valve position, and includes this in its inventory.

Standby Liquid Control (SLC)

The standby liquid control (SLC) system is a standby system which would normally never be operated during the lifetime of a plant. It may be actuated manually or by signals that indicate that an abnormal event has occurred. The flow rate may be accurately estimated by valve position and pump power signals. The flow rate is backed up by the water level instrumentation in the SLC storage tank.

REACTOR OUTFLOW SOURCES

The interpreter logic must also monitor water outflow from the reactor pressure vessel, in order to determine the net change in water inventory as a function of time. The sources of water outflow are: main steamlines (to turbine and bypass to condenser); safety relief valves; reactor water cleanup system; steam line to RCIC turbine; leakage through pump seals, flanges, and valve bonnets; broken pipes, leaking or broken instrument lines; RHR steam line; and RHR shutdown cooling line. The flow of coolant from the reactor is described below for the indicated outflow sources:

Main Steam Lines

The main steamlines have flowmeters designed for use during normal operation. The flow signal from these flowmeters is processed directly into the interpreter logic, which compares the flow signal to the main steam isolation valve (MSIV) position signals for verification of appropriateness of information. This flow rate is backed up by flow rate estimated from turbine first stage pressure and by generator output.

Safety Relief Valve

The flow rate from safety relief valves is determined in the manufacturer's facility prior to installation in the nuclear power station. Because the safety relief valve (SRV) flow rate is limited by critical flow in the throat of the valve, it can be calculated from the reactor pressure. Thus, by monitoring valve position and reactor pressure, the total outflow through the SRVs can be readily determined. For plants without valve position indicators, a discharge line pressure may be used instead. Note that there is no satisfactory way of determining leakage rate from a simmering valve, so SRV flow rate is assumed to be either several hundred thousand pounds per hour, or zero. Determination of valve position is from a position indicator, not from thermocouples, since thermocouples cannot differentiate from a simmering valve or a wide open valve.

Reactor Water Cleanup System

See the discussion in the Inflow Section above.

RCIC Steam Line

The steam line to the RCIC turbine carries the steam which provides the motive power for the RCIC turbine pump. The flow rate of steam is estimated from startup test data, valve lineup, and reactor pressure.

Leakage

The normal sources of leakage from the reactor vessel (such as pump seals and valve stems) are monitored through the flow from equipment drains and floor sumps. This flow, which is normally intermittent at a fixed flow rate is integrated into the interpreter logic to monitor leakage as a source of vessel outflow. Abnormal leakage, such as through a broken pipe or instrument line, may or may not be capable of being monitored, depending on location and size of the leak. A large leak in the primary system could overwhelm the equipment drain monitoring system.

RHR

The residual heat removal system (RHR) has two potential sources of coolant outflow: the condensing heat exchanger steam line and the shutdown heat removal line. At normal operating pressure, only the condensing heat exchanger steam line is a potential coolant outflow source since the shutdown cooling mode is a low-pressure system and is automatically isolated above intermediate vessel pressure. The shutdown cooling line outflow is normally routed into the RHR heat exchanger and back into the reactor vessel. However, it is possible for the valves to be arranged such that water flows out, and not back in. The interpreter logic monitors the many RHR valve positions to determine if there is a net outflow of RHR in the shutdown cooling mode.

INTEGRATION OF OUTFLOW AND INFLOW

The mass flow rate of all the above sources of inflow and outflow are continuously monitored by the interpreter logic and displayed on the cathode ray tube (CRT) output screen (10) in a form which is immediately useful to the operator. First, the interpreter logic integrates the outflow and inflow of mass to the reactor system. Then, based upon temperature measurements and a thermal hydraulic core flow model, it converts this into a distribution of liquid in the vessel. The final step is to relate the liquid volume to the distance from the top of the active fuel. The output is then displayed on the CRT screen as illustrated by the following example:

The reactor scrammed at 07:15:37

Two-phase water level is 10 feet above the top of the active fuel

Water level is dropping at a rate of 2 feet per minute

Net outflow from reactor is 100,000 lb/hr

At the present rate, it will take 13 minutes before the top of the core is uncovered Primary source of outflow is through the relief valves Primary source of inflow is from the feedwater system Core flow is in natural circulation at 1 million pounds per hour 20% of rated core flow.

The above output is typical of the primary output of the interpreter logic, which is the normal output to which the screen reverts when there are no requests for secondary information. In addition to the primary output, there is also a secondary output which can be displayed upon request.

| Examples of Secondary Output Forms | | | |
|---|---|---|---|
| Pushbutton #1. | Reactor Vessel Inflow and Outflow in Ranked Order. | | |
| | Parameter | Value | Units |
| OUTFLOW: | | | |
| a. | Main Steam Lines | XX | lb/sec |
| b. | Safety Relief Valve No. XX | XX | lb/sec |
| c. | RHR | XX | lb/sec |
| d. | RCIC Turbine Exhaust | XX | lb/sec |
| e. | RWCU | XX | lb/sec |
| f. | Leak Detection | XX | lb/sec |
| | Parameter | Value | Units |
| INFLOW: | | | |
| a. | Feedwater | XX | lb/sec |
| b. | HPCS | XX | lb/sec |
| c. | LPCS | XX | lb/sec |
| d. | RHR | XX | lb/sec |
| e. | RCIC | XX | lb/sec |
| f. | Standby Liquid Control | XX | lb/sec |
| g. | CRD Return | XX | lb/sec |

| Pushbutton #2. | Status of Reactor Core | |
|---|---|---|
| Parameter | Value | Units |
| Reactor Scrammed at | XX:XX:XX | Hrs/Min/Sec |
| Current Decay Heat Level | XX | Mwt |
| *Current Power Level | XXX | Mwt |
| Reactor Coolant Level above Core | XX | Inches above Active Core |
| Reactor Pressure | XXXX | Psig |

| Pushbutton #2. | System Status Statements |
|---|---|
| | Display |

Averaged wide range water level is R × WLW inches using the following transmitter signals:

B22-N026A, xxx inches
    B22-N026B, xxx inches
    B22-N026C, xxx inches

Reactor water level is below the range of narrow range instruments.

| Pushbutton #3. | Status of Containment | |
|---|---|---|
| Parameter | Value | Units |
| Containment Pressure | XX | lb/sec |
| Suppression Pool Water Level | XXX | feet |
| Suppression Pool Water Average Temperature | XXX | °F. |
| Suppression Pool Water Peak Temperature | XXX | °F. |
| *Suppression Pool Water Peak Temperature Rate | XXX | °F./min |
| Coolant Flow into Suppression Pool | XXX | lb/sec |
| Coolant Flow out of Suppression Pool | XXX | lb/sec |
| *Suppression Pool Water Cooling Rate | XX | °F./min |
| Containment Region Hydrogen Concentration | XX | % |
| Containment Region Oxygen Concentration | XX | % |
| Drywell Environmental Temperature | XXX | °F. |

| Pushbutton #4. | Status of Makeup Sources* |
|---|---|
| WATER MAKEUP SYSTEMS - DISABLED: | |

Feedwater
    HPCS
    LPCS
    RHR
    RCIC
    Standby Liquid Control
    Control Rod Drive Cooling

WATER MAKEUP SYSTEMS - NORMAL:

Feedwater
    HPCS
    LPCS
    RHR
    RCIC
    Standby Liquid Control
    Control Rod Drive Cooling

-continued
Examples of Secondary Output Forms
SYSTEM STATUS STATEMENTS (Examples)
Displays Valve 5-4V22 is open and feedwater is being bypassed to the condenser.
SLC Pump A motor breaker disconnected.
SLC Pump B motor breaker disconnected.
RHR Pump A motor breaker disconnected.
RHR Pump B motor breaker disconnected.
RHR Pump C motor breaker disconnected.
RHR Loop A: Incorrect valve lineup; pump discharge is lined up for LPCI; suction is lined up for shutdown cooling.
RHR Loop B: Incorrect valve lineup; pump discharge is lined up for LPCI; suction is lined up for shutdown cooling.
RHR Seawater to RHR Loop B connection valves are open, and the Loop B is lined up for flooding the reactor with seawater.

Pushbutton #5.  Status of Instrumentation
System Status Statements (Examples)
Displays The three methods of calculating main steam flow do not agree within xxx psi. Main steam flow is being calculated by averaging the following methods:
Measured steam flow, xxx lb/sec
Turbine first stage pressure, xxx lb/sec
Generator output, xxx lb/sec
Feedwater measured by nozzles in reactor feedwater line and flow measured at reactor feed pump suction lines disagree by xxx lb/sec.
Both wide range level transmitter signals B22-N026A and B22-N026C do not indicate within xxx to xxx inches. A power failure may exist. Wide range level transmitter B22-N026B is being used.
Narrow range and wide range water level indication differs by xxx inches. Narrow range value is being used.
Reactor Water Level is below the range of narrow range instruments.
Narrow range reactor water level instruments do not agree with xxx psi.

Pushbutton #6.  Status of Auxiliary Support System
System Status Statements (Examples)
Displays Loss of Instrument Air, A
Loss of Instrument Air, B
Loss of Essential Bus #1
Loss of Essential Bus #2
Loss of Essential Bus #3
Loss of DC Bus A
Loss of DC Bus B
Loss of Auxiliary Power Bus A
Loss of Auxiliary Power Bus B
RHR Seawater pump A motor breaker disconnected
RHR Seawater pump B motor breaker disconnected
RHR Seawater pump C motor breaker disconnected
RHR Seawater pump D motor breaker disconnected

GRAPHICAL DISPLAYS

Pushbuttons 7-11 are for the graphical trend displays. The following graphical displays are available for selection by the operator):

Pushbutton #7. Reactor Coolant Level
 Range: 2 feet below active core to 2 feet above level 8.
 Time Range: 15 min., 1 hr., 2 hr., 4 hr.
 Different color in level trace above and below the top of active core.
Pushbutton #8. Reactor Pressure
 Range: 0 to 1400 psia
 Time Scale: 15 min., 1 hr., 2 hr., 4 hr.
 Different color on level trace above 1150 psia.
Pushbutton #9. Reactor Power
 Range: 0 to 110% power.
 Time scale: 1 min., 10 min., 1 hr., 2 hr.
Pushbutton #10. Containment Pressure
 Range: 0 to 70 psia
 Time Range: 15 min., 2 hr., 4 hr., 12 hr.
 Different color for pressure above 60 psia.

The primary output indicated above is displayed on the CRT (9), unless the operator selects one of the eleven secondary outputs for display by pushing the button asociated with that display. The secondary output is displayed as long as the operator presses the button, then the CRT screen reverts to the primary display automatically when he releases the button. Alternatively, the graphical displays or all the secondary displays may be displayed on a second CRT (10).

During normal operation, when the interpreter logic is in a standby mode, it is calculating the water level based on the integration of the inflow and outflow, while the level is being measured directly by process instrumentation level meters. Because the inflow and outflow cannot be measured perfectly, the calculated water level will tend to drift gradually away from the actual level, and must be reset periodically to be consistent with the actual indicated level. The resulting process is done periodically and selectively so that it does not introduce a mechanism which could thwart the primary function of the interpreter logic during a severe transient or accident, when it is expected to provide an alternate means of determining whether the core is covered. In other words, if the backup level indication is parroting the normal level instrumentation, it's not a backup at all. For that reason, resetting of water level is only done when the interpreter logic verifies that the plant is in a normal mode of operation.

A preferred embodiment of the invention will now be described in detail with respect to FIG. 1 which shows in detail one of the ten systems, the low pressure core spray systems (LPCS), and how its interconnections are made with the interpreter logic of FIG. 2, in accordance with the teachings of the present invention. The operation of the LPCS hardware logic within the interpreter logic (22) shown in FIG. 2 will be described in detail with reference to the logic flowcharts of FIGS. 4, 5, 6, and 7.

Referring now to FIG. 1, the core spray nozzles (102) are shown within the reactor vessel (100). A manually-operated gate valve (V1), having an indicator light which appears on the main control panel, is connected to the spray nozzles (102). Other valves and flowmeters in the loop are as follows: air-operated testable check valve with an indicator light (V2); motor-operated gate valve, normally closed (V3); flowmeter (114) with flow element (FE) and transmitter (F1); pressure transmitter (112) with output (P1); LPCS pump (104) without output (C1); motor-operated gate valve, normally open (V6), which is connected to provide for pumping water from the suppression pool (106). A motor-operated globe valve (V4), normally open, is provided in a test line (109) and a motor-operated globe valve (V5), normally open, is provided in a minimum bypass line (110). The line (110) provides for injecting water into the suppression pool as indicated by the arrowhead. Valve V4 is open when the elements in the loop (V6), pump (104), pressure transmitter (112), and flowmeter (114) are to be tested by routing water through the test valve (V4).

The function of the low pressure core spray system (LPCS) is to provide reactor pressure vessel water makeup during a break of a large primary coolant pipe within the primary containment system. The LPCS will spray cooling water into the active core region within the reactor vessel (100) to prevent overheating of the reactor fuel elements and to preclude failure of the clad.

Figure 4:
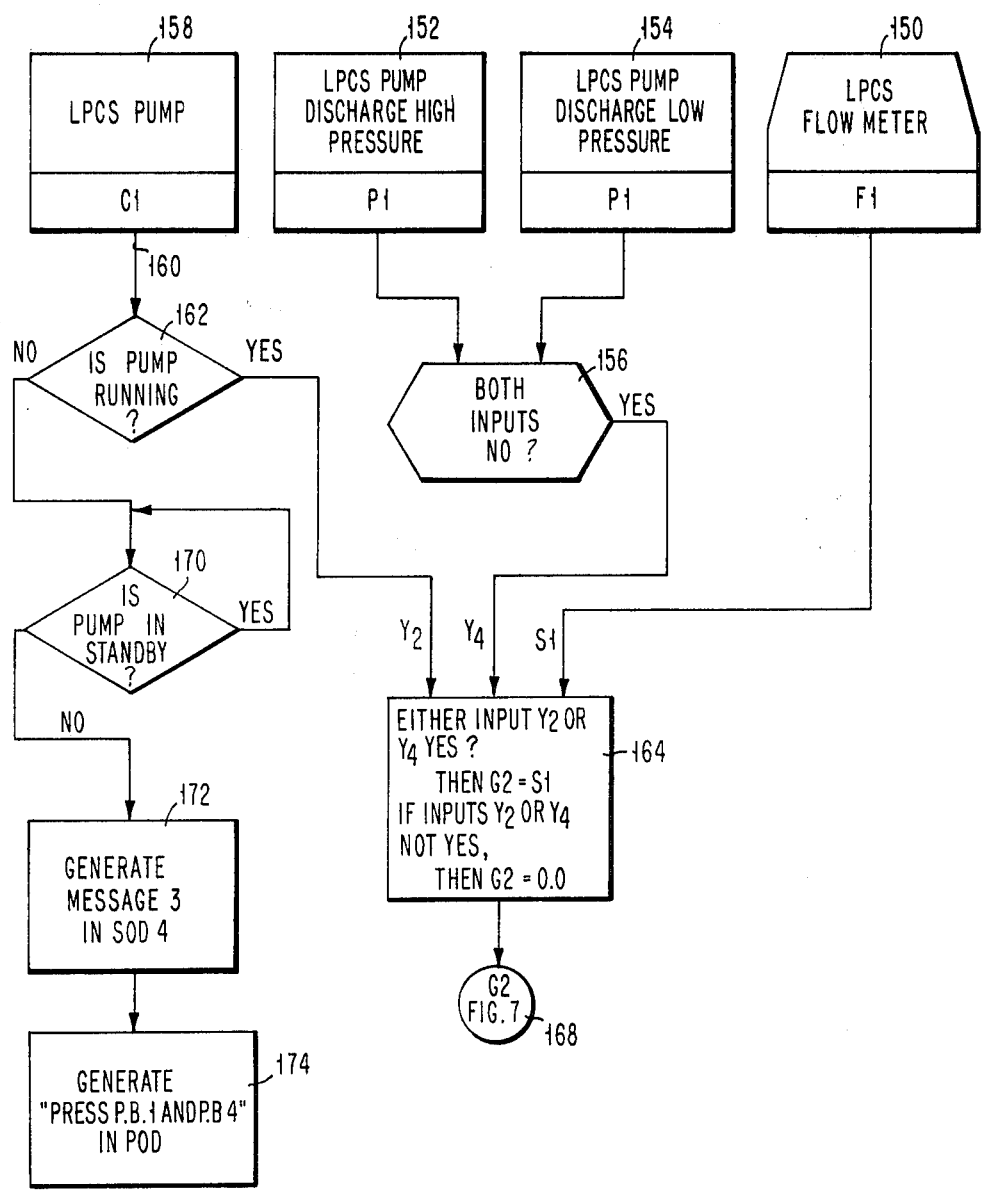
FIGS. 4–7 are flowcharts illustrating the evaluation of input signals by the master program.
Figure 5:
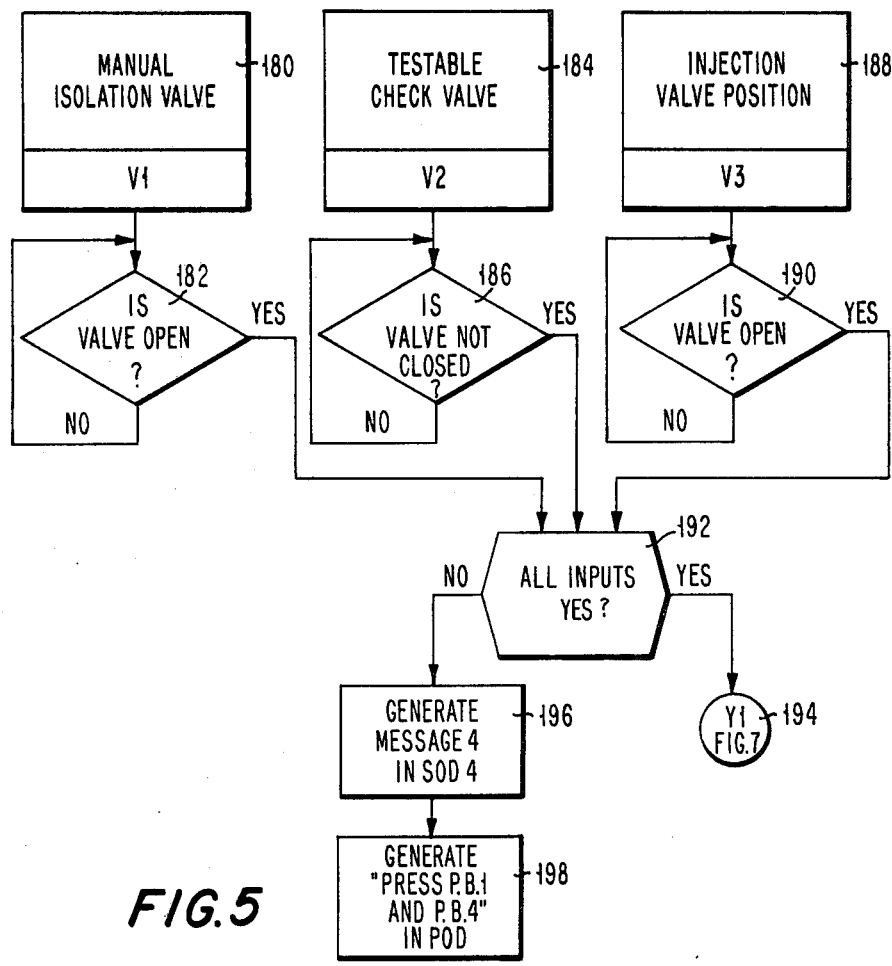

Refer now to the logic flowcharts of FIGS. 4 through 7. The system flow rate is measured using the flowmeter (114) at logic block 150 in FIG. 4. The control panel indicating light which indicates that the pump is operating or the pump discharge pressure (P1) from pressure transmitter (112) is checked to see if it is within the high pressure set point, logic block 152, or the low pressure set point, logic block 154. If both of the outputs from blocks 152 and 154 are no, a yes signal (Y4) is generated from logic block 156. A pump-operating indication (C1) from logic block 158 provides a confirming signal (160) to assure that flow rate is present, i.e., that the pump is running. If the pump is running, decision block 162 provides a yes output (Y2) to the logic block 164. In logic block 164, the inputs Y2 and Y4 are checked to see if either input is yes. If either one is yes, then the value (G2) at logic block 168 is assigned the flow rate value (S1) from the flowmeter logic block 150. The value of G2 provided at 168 in FIG. 4 is used at FIG. 7 to ultimately calculate the LPCS flow rate into the reactor in pounds per second.

Returning again to decision block 162, if the pump is not running, a no output is transferred to decision block 170. If th pump is not in standby, a no output from decision 170 causes the system status statements generator (FIG. 2, 118) to generate Message 3 in the secondary output display (4).

The plant operator assistance messages for the low pressure core spray system are as follows:

Message 1: LPCS minimum flow bypass valve is open.

Message 2: LPCS valve lineup is incorrect for injection.

Message 3: LPCS pump motor breaker is disconnected.

Message 4: LPCS injection line valves are incorrect for injection. Check valves V1, V2, and V3.

Message 5: LPCS test valve is open.

In addition to generating Message 3 in secondary output display (SOD) 4 at logic block 172, the logic block 174 energizes one of the lines (24) of FIG. 2, to cause the primary output display selector (26) to generate the message "press pushbutton 1 and pushbutton 4" in the primary output display. The operator, when viewing the primary output display, sees the message "press pushbutton 1 and pushbutton 4." The operator can then press these pushbuttons shown in FIG. 3. When pushbutton 4 is pressed, the status of makeup sources will be displayed. Along with this display is the Message 3 "LPCS pump motor breaker is disconnected" (as an example).

The valve lineups are checked by the interpreter logic (22) to assure that the coolant is being injected into the reactor pressure vessel (100). This is done by means of the logic shown in FIG. 5. The manual isolation valve (V1) output from logic block 180 is checked in decision block 182 to see if the valve is open. The testable check valve (V2) output from logic block 184 is checked in decision block 186 to see if the valve is not closed. The injection valve (V3) at logic block 188 is checked in decision block 190 to see if the valve is open. If all of these inputs are yes, as indicated at logic block 192, then an output (Y1) at block 194 is provided. This output is passed on to the logic shown in FIG. 7. If one or more of the inputs of block 192 is not yes, Message 4 is generated in SOD4 at logic block 196. Message 4 states that "LPCS injection line valves are incorrect for injection; Check valves V1, V2, and V3." Furthermore, the interpreter logic (22, FIG. 2) raises appropriate lines (24) to cause the primary output display selector (26) to generate the message "press pushbutton 1 and pushbutton 4" in the primary output display as illustrated by the logic block 198.

Figure 6:
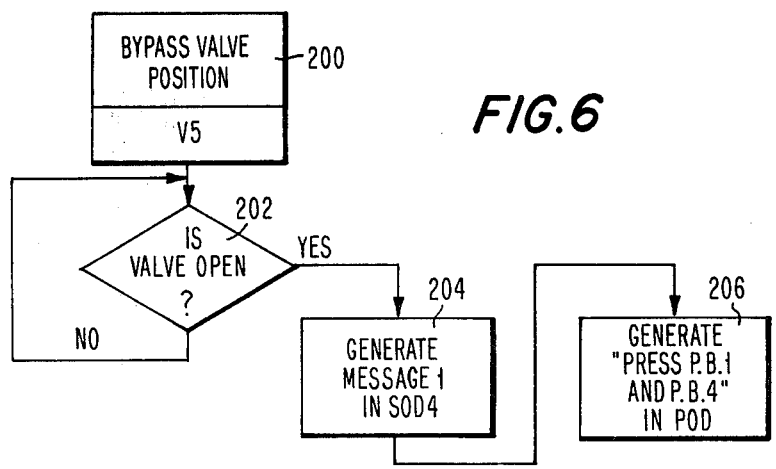

In FIG. 6, the interpreter logic checks the bypass valve (V5) position at logic block 200. At decision block 202, if the valve is open, a yes output is generated which causes Message 1 to be generated in SOD4, at logic block 204, and the message "press pushbutton 1 and pushbutton 4" to be generated in the POD at logic block 206.

Figure 7:
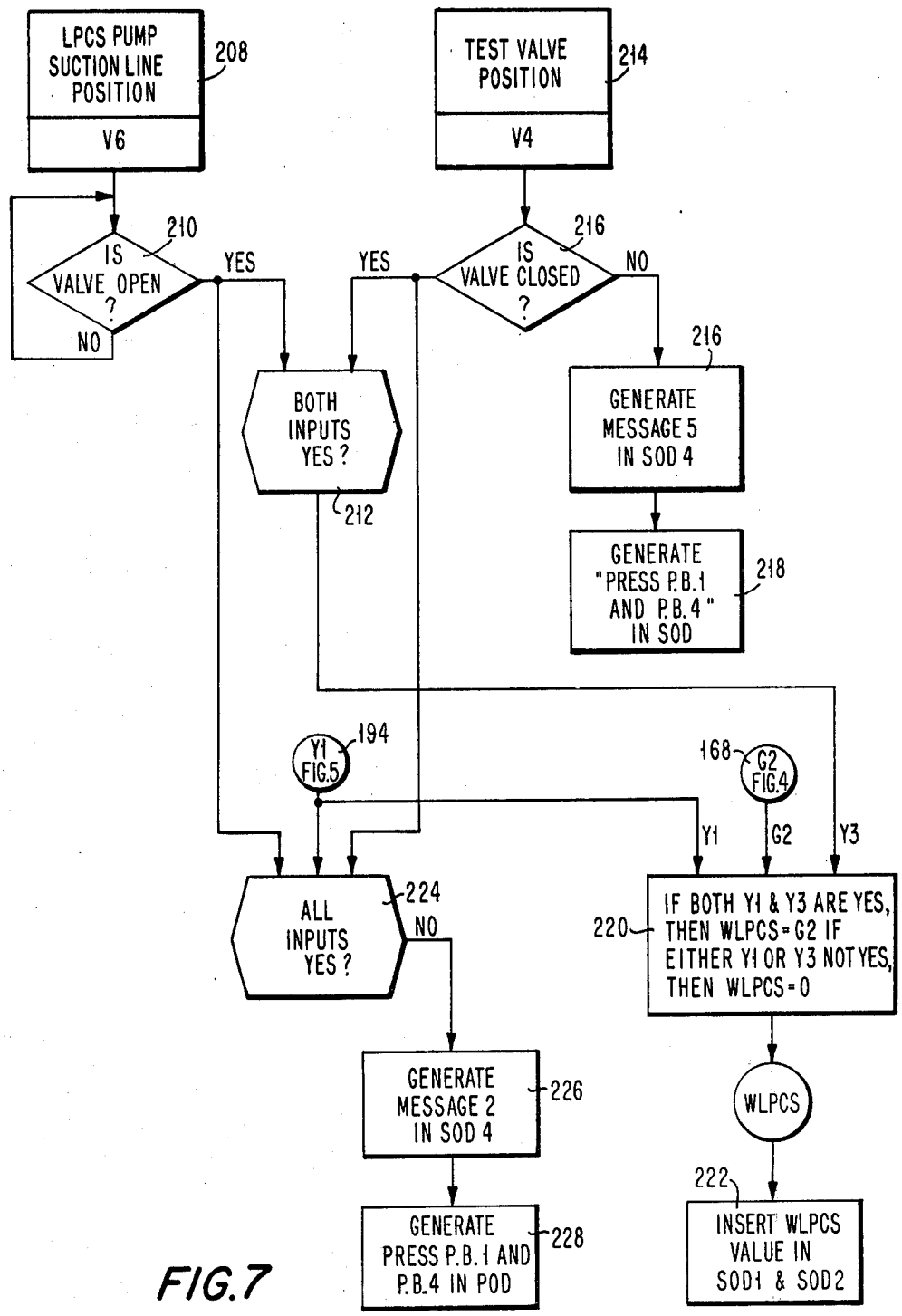

In FIG. 7, at block 208, the position of the LPCS pump suction line valve (V6) is checked. If the valve is open, an output from decision block 210 is provided to logic 212. Furthermore, the test valve position (214) of valve V4 is checked at decision block 216. If the valve is closed, a yes output is provided to block 212. If the valve is not closed, a no output is provided to block 216 which causes Message 5 to be generated in SOD4. Message 5 states that "LPCS test valve is open." Additionally, the message "press pushbutton 1 and pushbutton 4" is generated in the SOD as shown at logic block 218.

If both of the inputs to logic block 212 are yes, an output (Y3) is provided to the logic block (220). If the input (Y1) from FIG. 5, (which indicates that the valve lineups for V1, V2, and V3 are correct), and the input Y3 (which indicates that the valve lineups for V4 and V6 are correct), are present, then the LPCS flow rate (WLPCS) to the reactor is set equal to G2. G2 is the value from FIG. 4 calculated by the flowmeter (F1). If either Y1 or Y3 is not yes, indicating that the valve lineups are incorrect, then the flow rate (WLPCS) is set to zero.

At logic block 222, the value for the flow rate is inserted into the secondary output displays, SOD1 and SOD2.

Referring now to logic block 224, if all of the inputs are not yes, that is if any of the valve lineups are incorrect, then a no output is provided to logic block 226. This causes Message 2 to be generated in SOD4. Message 2 states that "LPCS valve lineup is incorrect for injection." Furthermore, the interpreter logic raises appropriate ones of the lines (24) in FIG. 2 to cause the message "press pushbutton 1 and pushbutton 4" to be generated in the primary output display.

As has been illustrated, plant operator assistance messages are displayed when the flowmeter indication does not agree with the pump operating indication. Furthermore, improper valve position messages are displayed. These incorrect valve alignments would impair or impede coolant flow into the reactor pressure vessel. The messages alert the operator so that the operator can confirm the incorrect alignment and take proper corrective action.

What follows is a detailed description of each of the remaining nine systems which provide information as to the net water inventory.

NUCLEAR BOILER SYSTEM

Reactor Pressure

The reactor pressure is an important parameter to determine the reactor status. Its measurement must be known as precisely as possible. There are only two power supplies available for two pairs of pressure transmitters. A loss of one power supply can affect two pressure transmitters simultaneously. In the event of one power supply failure, two pressure transmitters would likely indicate different output pressures from the remaining two nonfailed pressure transmitters. This would lead to the indeterminant state of each pair confirming their validity. To avoid the dilemma of the indeterminant state, only three of the four available pressure transmitters are used.

The interpreter logic compares the pressure transmitter output signals against an upper (U1) and lower (L1) expected operating range pressure limit. If the two signals (S1 and S2) of a pair of pressure transmitters having a common power supply are both outside the upper and lower range, the interpreter logic assumes that they are both incorrect due to a failure of their common power supply. The logic then uses the remaining pressure transmitter signal (S3). In the event that either S1 or S2 fall within the range of U1 to L1, the interpreter logic compares three pressure signals using pressure transmitter signals S1, S2, and S3. If any two of these signals agree within a first level of accuracy (A1), the average of all signals agreeing within A1 is calculated and used in the priority selection process.

If there is no agreement within A1 of any of the signals, a comparison is made at the second level of accuracy (A2). If there is agreement within at least one pair at this level of accuracy, the logic selects a signal using the average of all signals within A2 and displays a message regarding the fact of the poor accuracy of the pressure measurement.

If there is no agreement at the second level of accuracy, an average of all three signals that are within expected reactor operating range, U1 to L1, is used, and a similar caveat regarding accuracy of pressure is dislayed.

Safety/Relief Valve Flow Rate

The safety/relief valve (S/RV) employs an external actuator when the valve is operated in the relief mode or in the automatic depressurization system (ADS) mode. A position switch indicating the actuator position of valve open or valve closed is displayed on the control room panel.

The actuator position indicator will indicate correctly when the more likely relief function occurs. It will not indicate when the valve open in its safety function or fails to close. A direct step position indicator device is also installed. The interpreter logic accepts a digital actuator position signal and one analog signal from a valve stem position signal.

The S/RV steam flow (per valve) as a function of reactor pressure is provided by an empirical equation supplied by the valve manufacturer. The interpreter logic uses the pressure vs. flow curve to establish the steamflow rate.

Main Steamline Flow Rate

The main steamline flow contributes significantly to the changes in reactor water inventory. Three methods are used to calculate the value of main steamflow. They are: (1) flow nozzles, (2) turbine first stage pressure, and (3) generator output. The turbine bypass flow in the second and third methods are accounted for in the determination.

Flow Nozzle Method

This method uses the total steamflow signal from a process computer. This process computer signal is generated from the flow meter and transmitter, F1 and T1, respectively. The main steamflow transmitter is calibrated to measure steamflow rate at rated reactor pressure of 1020 psia. The actual flow for a transmitter at 1020 psia will vary directly with reactor pressure. The interpreter logic provides this calculation.

Turbine First Stage Pressure Method

This method uses the turbine first stage pressure signal. The flow rate as a function of first stage pressure is provided by the vendor. A typical equation is in the form of:

$$W_{istg} = C1 \times P_{istg} + C2$$

where
- $W_{istg}$ = turbine first stage flow rate
- $P_{istg}$ = turbine first stage pressure
- C1 and C2 = empirical constants determined by tests or plant operation The above equation can be converted to an equation in terms of milliamp output of a pressure transmitter signal. The signal needs to be corrected for the condenser vacuum compensation. The expression takes on a form of:

$$W_{istg} = C3 \times P_{istg} + C4 \times P_{cond} + C5$$

where
- $W_{istg}$ = turbine first stage flow rate
- $P_{istg}$ = turbine first stage pressure
- $P_{cond}$ = condenser vacuum pressure
- C3, C4, and C5 = constants of determination. These are determined from the milliamp scale of the pressure output signal and the range of condenser vacuum.

Generator Output Method

The generator output vs. calculated main steamflow rate is provided by the vendor. This relationship between the two parameters is used for the comparison of steamflow rates.

The turbine bypass flow as a function of accumulated open position of the five bypass valves are provided by the vendor. The flow is usually based upon rated turbine inlet pressure.

The interpreter logic compares the three flow signals discussed above. If any two of these signals agree within a first level of accuracy (A4), the average of the two flow signals within A4 is calculated and used in the priority selection process.

If there is no agreement within A4 lb/sec of any of the signals, a comparison will be made at a second level (A5) of accuracy, the average of the two signals within A5 is calculated and used in the priority selection process.

If there is no agreement within A5, an average of all three flow signals is used in the priority selection process.

Reactor Water Level

There are three sets of reactor water level instrumentation. They are: (1) narrow range, (2) wide range, and (3) fuel zone reactor level instruments. The three sets overlap over a limited range. The narrow range instrumentation is completely overlapped by the wide range monitor, because the narrow range instrumentation range is less than the wide range. Thus, there is a region covered only by the wide range instrumentation. The interpreter logic uses the narrow range instrument signals as the primary signal which is checked by the wide range measurement. If the two signals disagree by greater than a preset amount, a display is shown on the CRT display.

The wide range instrumentation is overlapped over its lower range by the fuel zone reactor water level instrumentation. The wide range instrument signal is solely used in the span between the bottom of the narrow range instrument signal and the top of the fuel zone reactor water level signal.

The wide range monitors are also used in the interpreter logic in the zone where both the wide range and the fuel zone reactor water level instruments are available. The wide range instrument signal is checked by the fuel zone signal. If the water level indication differs by a predetermined amount, a CRT display is announced. The primary signal for the algorithm is the wide range water level indication over this zone.

The fuel zone reactor water level instrument is the only available source below the lower limit of the wide range instrument signal. Therefore, it is used for indications of water level in that region.

The wide range water level instrumentation consists of four instruments, four vessel pressure taps at four azimuth locations at one elevation. However, there are two power supplies each powering two instruments. Failure mode of the power supply would result in affecting two instruments identically. Including four instruments in the algorithm to determine the correctness of the signal would lead only to an indeterminate state. The interpreter logic uses only three of the four wide range instruments and calculates the average value of the signals that agree within a predetermined amount of inches as the processed value of reactor wide range water level.

Control Rod Drive (CRD) System

Cooling water can be added to the reactor pressure vessel by the control rod drive cooling water. The interpreter logic uses the output of a flow element as the coolant rate added to the reactor vessel. The flow element output is used as long as the value exceeds a minimum established flow element uncertainty value.

In addition to the flow element output signal, the valve alignment is checked to assure that the flowpath is correct for flow to the vessel. The interpreter logic checks this, then establishes that the flow is directed to the vessel.

Feedwater Control System

The primary flow measurement used in the interpreter logic is the total feedwater flow analog signal to the plant control process computer.

The secondary flow signal is developed using the output of the four flowmeters located in the feedwater pump suction lines. These flowmeters are provided for controlling the minimum flow bypass valves. If the valves are open, the interpreter logic calculates the bypass flows.

The interpreter logic will always use the primary flow signal in the coolant inventory calculation, but will cause an alarm if there is disagreement by an error value amount between the primary and secondary signals and if the valve in the line from the reactor feedwater line to the main condenser is open.

Standby Liquid Control System (SLCS)

The principal function of the standby liquid control system is to provide a diverse and redundant reactor protection system. Upon demand, the manually-initiated SLCS injects a borated solution into the reactor vessel. The borated solution is a neutron-absorbing substance that is capable of shutting down the reactor.

The borated solution contains a significant amount of water that can be credited to providing reactor vessel makeup water.

The valve alignments are checked for positioning to inject into the reactor vessel. The pump suction valves are checked for opening. One or both valves open would permit flow to the pumps. Either Squib valves on the discharge line are checked for opening. One is sufficient for SLC flowpath success.

The pump status is established by the operating indicator lights on the control room panel. If both the red and green indicator lights are not on, then an error message indicating the circuit breaker being disconnected is displayed. If the pump green light is on, then the pump has indicated that it is in standby state.

If the red light is on, then the pump is running. The interpreter logic performs an integration of the pump output with time to derive the flow going to the reactor vessel. This calculation is compared to the SLC storage tank liquid level indication to confirm the solution is being delivered to the reactor vessel. If the quantity of water being depleted from the storage tank does not agree with the integrated flow calculational quantity by an acceptable amount, an error message is displayed.

Containment System

The purpose of the containment system algorithm is to provide the logic and input necessary to produce a status display and determine the enthalpy of the water being drawn from the suppression pool.

There are typically four suppression pool temperature sensors on Boiling Water Reactors. The interpreter logic uses the average and the maximum temperatures for its input.

For the drywell temperature, two of the five drywell cooler supply air temperature detectors are used to obtain maximum and average drywell air temperatures.

Water can be added to the suppression pool from the following sources:

1. Condensed steam from the safety/relief valve discharge.
2. Residual heat removal system steam condensing, sea water or service water flooding, and reactor to pool path.
3. High pressure core spray system from the condensate storage tank in the test mode.
4. Reactor core isolation cooling system turbine exhaust.

Water can be removed by pumping through the RHR loop A to the radwaste system.

The net change in the suppression pool inventory is calculated by the net inflow and outflows integrated over time.

Energy changes to the suppression pool are calculated by integrating the flow times the enthalpy product for each flow source.

Residual Heat Removal

The residual heat removal (RHR) system is designed to remove decay and sensible heat from a nuclear boiling water reactor under normal and accident conditions as well as during refueling operations. The system also cools the suppression pool.

The RHR system forms a closed loop with the reactor vessel or the containment. It consists essentially of piping, water pumps, and heat exchangers. The system is made up of four subsystems used under normal and emergency conditions:
1. Low pressure coolant injection (LPCI)
2. Suppression pool cooling
3. Reactor steam condensing
4. Shutdown cooling.

The LPCI subsystem operates in conjunction with the high pressure core spray (HPCS) system or the automatic depressurization system (ADS) and the low pressure core spray (LPCS) system to restore and maintain the desired water level in the reactor vessel for cooling after a loss-of-coolant accident caused by a line break large enough to deplete the coolant inventory to below the top of the core.

The suppression pool cooling subsystem cools the suppression pool by using the RHR pumps and heat exchangers.

During reactor core isolation cooling system operation, the RHR heat exchangers may operate as reactor steam condensing units thereby making it possible to maintain the reactor at hot standby. This mode is the reactor steam condensing subsystem.

The shutdown cooling subsystem removes enough of the residual heat (decay and sensible heat) from the reactor primary system to cool it for refueling and servicing.

The RHR system is made up of Loop A, Loop B, and Loop C. Loops A and B have heat exchangers incorporated in their loops. These loops are used for the suppression pool cooling, shutdown cooling, and the reactor steam condensing subsystems. Loop C does not have a heat exchanger in its loop. It operates as a low pressure coolant injection mode only, adding water to the reactor vessel for cooling following a loss-of-coolant accident.

Loops A and B are almost identically designed loops operating in parallel. In the decay heat removal modes of operation, they are redundant systems for better reliability (i.e., if one loop is out of service, the other loop is capable of performing its intended design function).

All three loops (A, B, and C) function in the LPCI mode. This function is to supply a large quantity of water to the reactor pressure vessel following a loss-of-coolant accident. These loops operate in parallel and sufficient redundancy to make the system reliability acceptable.

The RHR system consists of many potential flowpaths and combinations of flowpaths or valve lineups. The pump discharge, pump suction, and other RHR flowpaths are described in Table 3.

The valve lineups described in Table 3 can be combined in many ways to allow normal and abnormal modes of operation of the RHR system. These combinations are described in Table 4.

Residual Heat Removal (RHR) Pump Flow

RHR pump flow is measured by flowmeters in each RHR loop. Two methods of confirming that the measured flow is correct are:
1. pump is running as indicated by the panel light
2. the pump discharge pressure high/low switch.

In some cases, calculation of flow in valve lineup combination is not simply based on metered flow, but is based on a heat balance, fluid friction in the RHR system and/or two-phase flow.

Valve Lineup Combination 8 and 12

These flowpath combinations provide a path from the reactor to the containment. The flow is measured by a flow element. These path combinations can result in loss of reactor coolant inventory, reactor depressurization and two-phase flow at the flow element.

The flow transmitters are calibrated for water at 68° F. In event there is two-phase flow in the flow element, the flow transmitter output must be adjusted to account for the difference in density of the two-phase mixture.

As flashing to two-phase flow occurs in the flow meter, the actual flow versus that indicated by the flow transmitter will reduce as the square root of the density change. The density change will be a function of reactor pressure and temperature, the hydraulic losses between the return line and the flow element, and the Moody two-phase flow correlation.

Valve Lineup Combination 10—Minimum Bypass Flow

Normally the minimum flow bypass orifice is sized for 10% of rated pump flow with a pump total density head (TDH) corresponding to 20% flow. Losses in the return line are usually negligible compared to the orifice. The orifice controls the hydraulic characteristics of the reactor—through minimum bypass line—to suppression pool flowpath.

During the initial phase of the transient of bypass valve open/shutdown suction line open, flow through the orifice will be cold water. If the condition continues for awhile, the piping down to the orifice will fill with hot water and two-phase flow will occur. The interpreter logic conservatively assumes that the higher, single-phase flow rate of cold water is used as long as the condition of the valve lineup combination 10 exists.

Valve Lineup Combination 18—Steam Flow to Heat Exchanger

There are no analog signals of steam flow to the RHR heat exchangers during steam condensing mode of operation. The elbow taps on the RHR steamline are used only as a high steam flow isolation signal.

A method of calculating steam flow is to determine heat transferred (cooling water flow times the temperature rise in the cooling water) and equate it to the steam condensed and the amount of subcooling.

The total heat transfer is calculated by $$Q = WC_p(T_o - T_i)$$

where
$Q$ = heat energy
$W$ = cooling flow
$C_p$ = specific heat capacity
$T_o$ = heat exchanger outlet temperature
$T_i$ = heat exchanger inlet temperature.

There is no heat exchanger inlet temperature measurement. However, the service water source, ocean water, will change temperature very slowly with the seasons. The interpreter logic makes adjustments to compensate for these temperature changes.

Isenthalpy expansion of steam to condensing pressure of 200 psig in the RHR heat exchanger and subsequent subcooling to the design value of 140° F. results in a steam condensing flow rate, $W_{sc}$ of:

$$W_{sc} = \frac{Q}{K} = \frac{WC_p(T_o - T_i)}{K}$$

Where
W, $C_p$, $T_o$ and $T_i$ have previously been defined.
K = a constant determined by the properties of the steam for the operating conditions.

The amount of subcooling of the condensate can be lower than 140° F. It can be as low as 60° F. at low flow rates and cold sea water. The enthalpy at 60° F. is 28 Btu/lb, a difference of approximately 80 Btu/lb. An error in the flow calculation as high as 7% will result if a constant denominator value of K is used. Therefore, the equations are modified to improve the accuracy.

Valve Lineup Combination 20—Reactor Outflow

This reactor coolant outflow path will exist if the RHR Loop A shutdown line from the reactor (Lineup 9) is open and the valves from Loop A to the radwaste collector tank (Lineup 13) are open.

The flow in the line to the collector tank will be limited primarily by the flow capacity of the valves in the B line to the collector tank. Initially, cold water from the RHR piping will flow to the tank as the piping fills with hotter reactor coolant. There will be two-phase flow if the coolant is above 212° F., and the flow rate will vary depending on the reactor pressure and if RHR pump A is operating. The interpreter logic accounts only for cold water flow.

Valve Lineup Combination 22—Reactor Outflow

This reactor coolant outflow path will exist if the shutdown line from the reactor (Lineup 9) is open and the heat exchanger vent line is open. The flow in the line will be limited primarily by the flow capacity of the valves in the one-inch line. Initially, cold water from the RHR piping will flow to the suppression pool as the piping fills with hotter reactor coolant. There will be flashing of liquid to two-phase flow if the reactor is above 212° F., and the flow rate will vary depending on reactor pressure and if RHR pump A is operating. The interpreter logic accounts only for cold water flow.

Valve Lineup Combination 16

The line from the RHR heat exchanger delivering condensate from the RHR heat exchanger to the suppression pool and RCIC pump suction is four inches in size. At design flow rate, the velocity in this line is approximately seven feet per second. This is a low velocity for water flow. As a result, the pressure drop in the line will be low. The control valve must, therefore, provide a high pressure drop even in its wide open position for the design case of 200 psig in the RHR heat exchanger, and 0 psig in the suppression pool. The interpreter logic assumes that the hydraulic characteristic of this valve lineup combination is controlled only by the position of the valve and its hydraulic loss coefficient versus position.

Lineup of Valves

In the event that both Loop A or suction line is open at the same time that the shutdown line is open, there will be a high blowdown rate if the reactor is above atmospheric pressure. The interpreter logic calculates the flow by using the frictional characteristic of the flow path and the Moody two-phase flow correlation for saturated liquid.

Heat Removal Rate

The interpreter logic calculates the RHR heat transfer rate by $$Q_{cc} = WC_p(T_o - T_i)$$

This value is assigned to the containment cooling rate if valve lineup combination 1, 4, or 11 exists. It is assigned to the shutdown cooling rate if valve lineup combination 2 or 5 exists.

Energy Dump to Suppression Pool

In the event that valve lineup combinations 8, 10, 16, or 22 exists, energy will be transferred from the reactor to the suppression pool.

Assuming that the reactor coolant blowing to the suppression pool is nearly saturated, the enthalpy of saturated water vs. pressure is calculated and used.

RHR Service Water Flow to the Suppression Pool

This flow is set equal to the output of the flow transmitter, if either valve lineup combination 9, 13, or 17 exists and RHR pump B is not operating with suction from the suppression pool. If RHR pump B is operating with suction from the suppression pool, service water flow to the suppression pool is set equal to the output of the flowmeter if a key valve is closed. For all other conditions, this flow is set at zero.

High Pressure Core Spray System

The high pressure core spray (HPCS) system is one of the systems comprising the emergency core cooling system. The operation of the HPCS system in the injection mode will result in an increase in reactor coolant inventory. The interpreter logic accounts for the coolant inventory increase by:

1. measuring the flow rate using a flowmeter and transmitter
2. flow is calculated by comparing measured pump total head (TDH) versus flow
3. if the pump motor is energized, a maximum flow rate based upon preoperational tests, is calculated
4. if the minimum flow bypass valve is open, the above calculated flow rates are reduced by a calculated minimum flow rate
5. the flow rates determined by items 1 and 2 above are compared. If there is agreement within a predetermined value, the flow measured using the flowmeter is used to calculate the reactor coolant inventory
6. if there is no agreement between flowmeter flow rate and flow rate determined by the total density head (TDH) method within another predetermined value, the metered flow rate will be used by the interpreter logic if it is both less than the maximum flow rate discussed in item 3 above and less than the flow rate calculated by pump TDH. If the meter flow rate does not pass this test, the interpreter logic will next use the flow rate determined by calculated pump TDH, if it is both less than the maximum flow rate and less than flow measured by the meter. If this flow rate does not pass the test, the interpreter logic will use the maximum flow rate discussed in item 3.

7. The interpreter logic will permit the flowmeter signal or the flow rate signal that is based on measured pump TDH to be used in the reactor coolant inventory calculation if:

(a) either the condensate storage tank suction valve or the suppression pool suction valve is open, and
   (b) either test valves are closed, and
   (c) there is a control room panel red light indicating the pump is operating?
   (d) the discharge line valve is open and check valve is not closed.

Leak Detection System

The leak detection system measures four flows that can affect reactor coolant inventory. The interpreter logic processes these four flows as follows:

1. RWCU blowdown to the main condenser is obtained from a flow transmitter and made available to the RWCU part of the interpreter logic.
2. Drywell high conductivity (floor drain sump) flow is obtained from a flow transmitter.
3. Drywell low conductivity (equipment drain sump) flow is obtained from a flow transmitter.
4. Drywell air cooler condensate flow is obtained from a flow transmitter.

The total leakage flow in the drywell is calculated by adding the low and high conductivity flows. After the initiation of reactor isolation signal, the total leakage is calculated to be total leakage at the time of isolation plus variation in drywell air cooler flow after isolation. The total flow in the low and high conductivity sump drain lines will not exceed 25 liters/min and 125 liters/min, respectively. Since the flow rates are low, the status of the isolation and bypass valves for the flowmeters are not monitored nor used in the interpreter logic. It is assumed that these valves are correctly operated and isolated if an isolation signal exists. It is also assumed that the low and high conductivity sump drain flows are all reactor coolant leakage. Also, time lag from leak to drain line is ignored.

Reactor Core Isolation System

The reactor core isolation cooling (RCIC) system is a steam turbine driven pump to provide water makeup during reactor core isolation transients. RCIC injection results in an increase in reactor coolant inventory. The interpreter logic calculates flow into the reactor as the output of the flowmeter if:

1. either of the test line valves is closed, and
2. the pump operation is confirmed by the turbine speed at pressures greater than 135 psig.

In addition, the interpreter logic displays are generated for RCIC initiation and isolation, system inoperable due to valve alignment, and mechanical overspeed trip. A steamline isolation valve is assumed to be closed if the turbine inlet pressure is a predetermined pressure less than reactor pressure. A mechanical overspeed trip is assumed if there is an initiation signal, but there is no remote manual trip, and turbine speed is less than the minimum operating range of 40%.

Reactor Water Cleanup System

The RWCU system under normal conditions is a closed loop system (flow out is equal to the flow in). However, there can be some valves open to blow down the reactor water to the main condenser, waste collector, or the surge tank. The interpreter logic accounts for this flow stream in the coolant inventory calculation.

The RWCU also has a flowmeter to measure flow from the reactor and return to the reactor vessel. These are used in the leak detection system. The interpreter logic uses the output of the flowmeters as the measure of net flow out of the RWCU, since any other flow stream out of the RWCU would have to be by a pipe break or an open, unindicated drain valve.

PROGRAMMING DESCRIPTION

Introduction

There are two main categories of interpreter logic, the thermal-hydraulics subroutine (the thermal-hydraulics core model) and the hardware logic associated with conditioning the incoming signals for the interpreter logic (22) of FIG. 2. A general flowchart illustrating the basic elements of the interpreter logic and its interrelationship with the software is shown in FIG. 8. The following sections describe the features of the master program and the thermal-hydraulics subroutine.

The purpose of the master program in conjunction with the interpretor hardware logic is to:

1. Collect and calculate data for display (blocks 250–254).
2. Monitor trends and limits that initiate changes of display (block 256).
3. Monitor and alert the operator that a system status statement exists by generating a prompt message to instruct the operator to push a SOD button for additional information (blocks 258 and 262).

The thermal-hydraulics subroutine (block 260) defines a thermal-hydraulics core model and calculates the reactor water level. It serves as a backup to the reactor water level instrumentation. The thermal-hydraulics subroutine is a separate software unit and is employed as a subroutine to the master program.

Master Program

The master program calculates an average value for the following parameters using a one-minute average of the input signals:
Reactor Power
Reactor Coolant Level
Reactor Pressure
Reactor Coolant Inventory Net Change
Containment Pressure The master program calculates the rate of change of the parameters shown in Table 1, by taking the updated average value of the parameters identified in the previous one-minute value.

The master program is provided with algorithms that detect and display the information stated in the previous description of the primary output display (POD).

The Primary Output Display parameter of Reactor Coolant Level above Core shall be equal to $R \times ML$ minus 369.75 inches, since interpreter logic calculates $R \times ML$ as distance above the reactor pressure vessel bottom head invert.

Sources of Parameter Input

The master program is programmed to employ the variables noted in Table 5 for display in the Primary Output Display (POD) shown in Table 1. Variables denoting rates of change on the POD are calculated by averaging five derivatives taken over one-minute intervals using the appropriate variables noted in Table 5.

TABLE 5

| Variable | POD Parameter Set | | Source |
| --- | --- | --- | --- |
| | Name | Units | |
| Reactor Power | Pwr | % Rated Power | Nuclear boiler system |
| Reactor Coolant Level | R × ML | Inches | Nuclear boiler system |
| Reactor Pressure | Pr | psig | Nuclear boiler system |
| Containment Pressure | Pc | psig | Containment system |
| Reactor Coolant Inventory Net Change | $W_{NET}$ | lbm/sec | See below |
| Electrical Loss of Power | — | — | See below |
| Loss of Instrument Air | — | — | See below |

Reactor Coolant Inventory Net Change

Table 2 shows the reactor coolant outflows and inflows. The master program sums the inflows and outflows to obtain the net change in inventory.

$$W_{NET} = WFW + WHPCS + WLPCS + WRCI\text{-}CI + WCRD + WSLC - C^*WMSM - WSRV - WRCICO - WRWCU - WLDS$$

Figure 11:
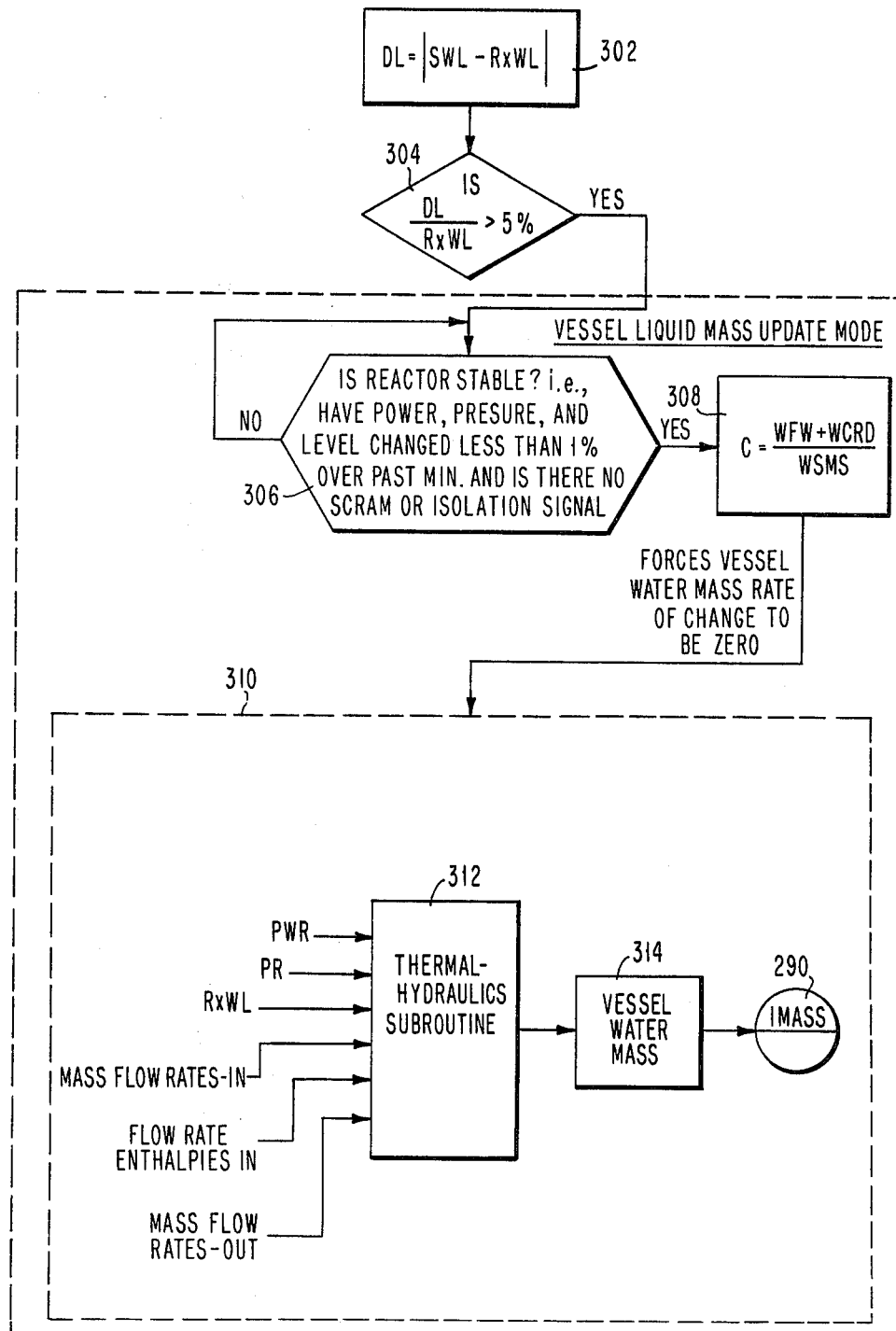
FIG. 11 is a flowchart of the procedure using the thermal-hydraulics program in the vessel mass update mode.

Note: See FIG. 11, block 308, for definition of "C."

Electrical Loss of Power

The master program is provided with signals that indicate loss of AC or DC power and identifies what bus the loss of power has occurred on.

Loss of Instrument Air

The master program is provided with signals that indicate loss of instrument air pressure.

Determination of Time to Limits

Time to Top of Core

Figure 9:
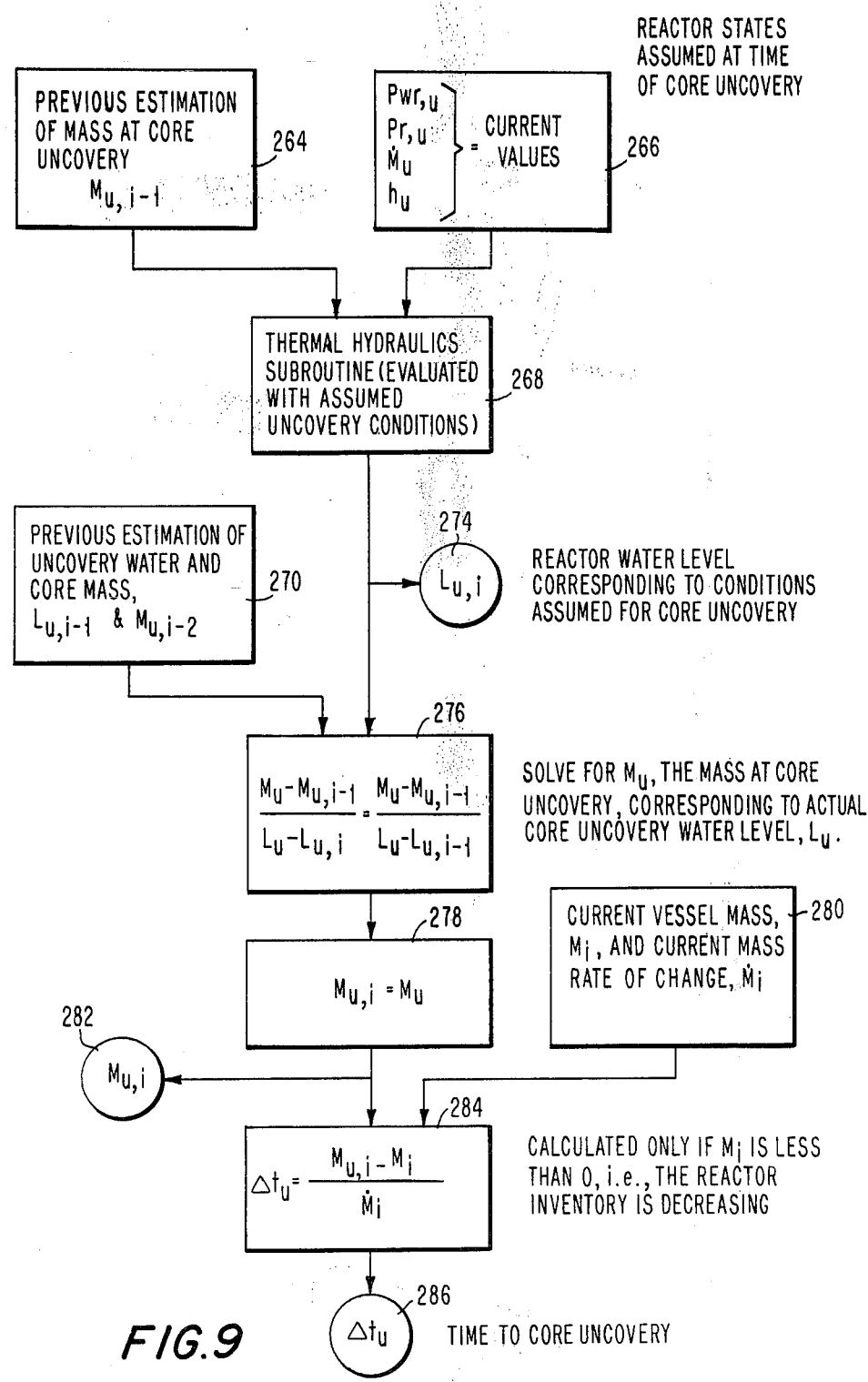
FIG. 9 is a flowchart of the procedure using the thermal-hydraulics analytical program for estimating the time to uncover the top of the core.

The time interval projected for the core to uncover is an important parameter because of the dependence of fuel integrity on reactor water level. Estimating this time interval by extrapolating the instrument water level to the level corresponding to core uncovery is not acceptable because changes in the vessel interval geometry with elevation and changes in the reactor power, pressure, and external flow rates can cause the water level to drop at varying rates. Employing the thermal-hydraulics subroutine with some interpolation logic and some assumptions regarding the reactor conditions at the time of core becoming uncovered significantly improves the estimation of time to core uncovery. This procedure is illustrated in FIG. 9. The subscript "u" in FIG. 9 denotes quantities associated with core uncovery. The resultant delta $t_u$ (block 286) is displayed on the POD as the time to core uncovery.

Time to Maximum Vessel Pressure

The time required to reach the vessel pressure limit is determined by extrapolating the vessel pressure time history to the limiting pressure. The time interval is determined by subtracting the current time from the time associated with the limiting pressure and is displayed on the POD.

The extrapolation is based on the first derivative of the pressure history only, but the pressure history is exponentially weighted so that the most recent data contributes more to the projection than older data. No value will be calculated if the extrapolated pressure slope is less than or equal to zero, i.e., the pressure is decreasing.

Time to Maximum Containment Pressure

The time required to reach the containment design limit is calculated in a similar manner as the time required to reach the vessel pressure limit (see previous paragraph), except the containment pressure is used rather than the vessel pressure in the extrapolation.

Interfaces with the thermal-hydraulics subroutine

The thermal-hydraulics subroutine's primary function is to serve as a backup to instrument water level measurements. The thermal-hydraulics subroutine calculated water level, SWL (block 300, FIG. 10), is the last choice in the selection process for the reactor water level, R×ML. The thermal-hydraulics subroutine provides the variable SWL continuously (i.e., once a minute) using the current reactor state for the calculation. The thermal-hydraulics subroutine also is used in the calculation of time to core uncovery (FIG. 9). The thermal-hydraulics subroutine is also employed in the water level calculation mode (FIG. 10). This process is performed once a minute as well.

The final thermal-hydraulics subroutine usage does not result in output to the POD but serves to correct the mass balance which may drift off due to instrument inaccuracy; hence, the term vessel mass update mode (FIG. 10). This calculation is initiated whenever the calculated water level differs from the instrument water level by more than 5%. The calculation employs current reactor states.

The Thermal-Hydraulic Subroutine—A Steady Thermal-Hydraulic Model for the Boiling Water Reactor System

The Physical Model

Figure 12:
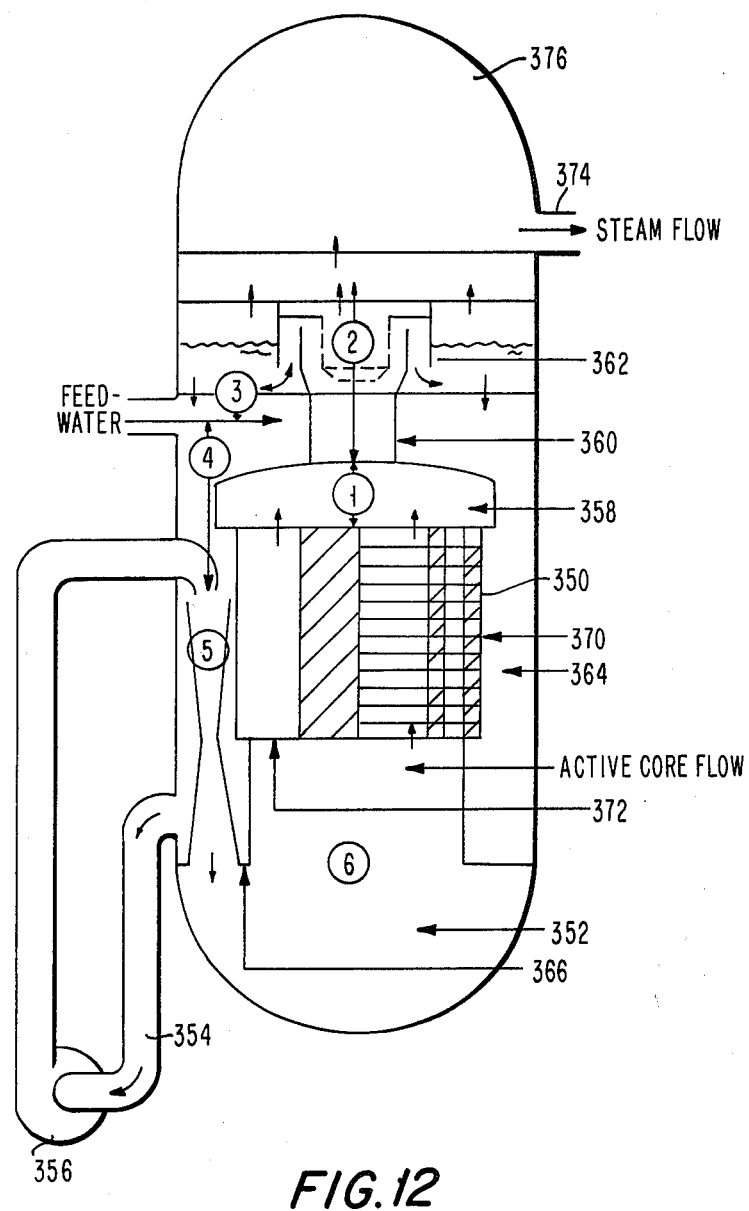
FIG. 12 is a thermal-hydraulics schematic for the boiling water reactor core and recirculation loop.
Figure 13:
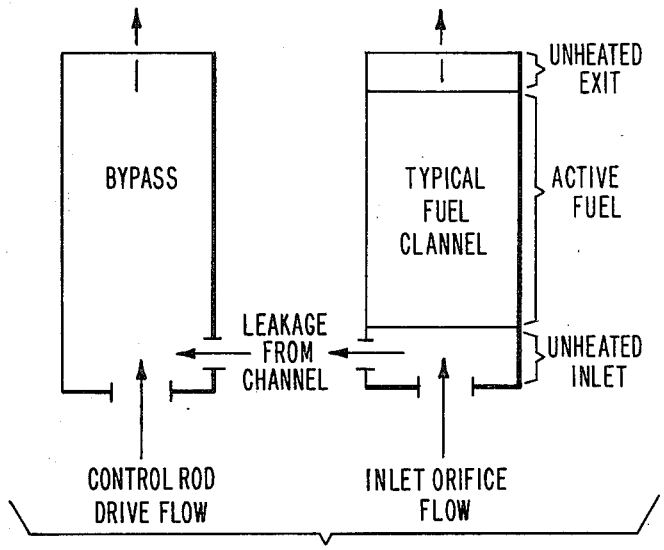
FIG. 13 is a schematic of the core and bypass region of the reactor of FIG. 12.

The Boiling Water Reactor (BWR) nuclear steam supply system, in its simplest form, consists of a nuclear reactor core and a recirculation coolant loop. FIG. 12 depicts the system layout for a BWR. The core is made up of an array of fuel bundles (350) and a core bypass region which provides a many parallel-path flow circuit to the passage of the coolant (shown schematically in FIG. 13). The recirculation loop consists of a flow path to return the nonvaporized coolant to the reactor vessel lower plenum (352), mixing the returning feedwater with it enroute. In a BWR, the return coolant circuit is partially within the reactor vessel and partially dual-path outside the vessel, with the dual-path external circuit (354) containing motor-driven pumps (356). The coolant entering the bottom of the core, flows upwards through the fuel bundle, achieving partial vaporization. Consequently, two-phase flow exists in the fuel bundles (350), the upper plenum (358), the standpipes (360), and the steam separators (362). There may also be a very small amount of steam carryunder in the coolant in the path from the steam separators to the feedwater sparger ring.

Figure 14:
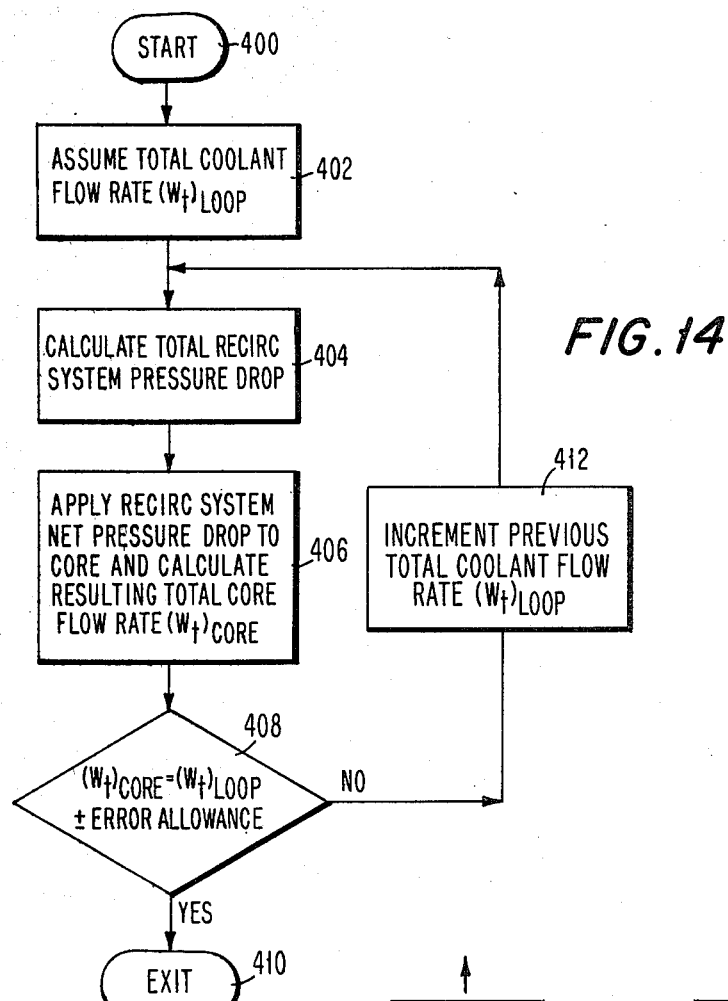
FIG. 14 is a flowchart of the procedure using the thermal-hydraulics program for recirculation loop analysis (downcomer level known); and, FIG. 15 is a flowchart of the procedure using the thermal-hydraulics program for recirculation loop analysis (total mass known).
Figure 15:
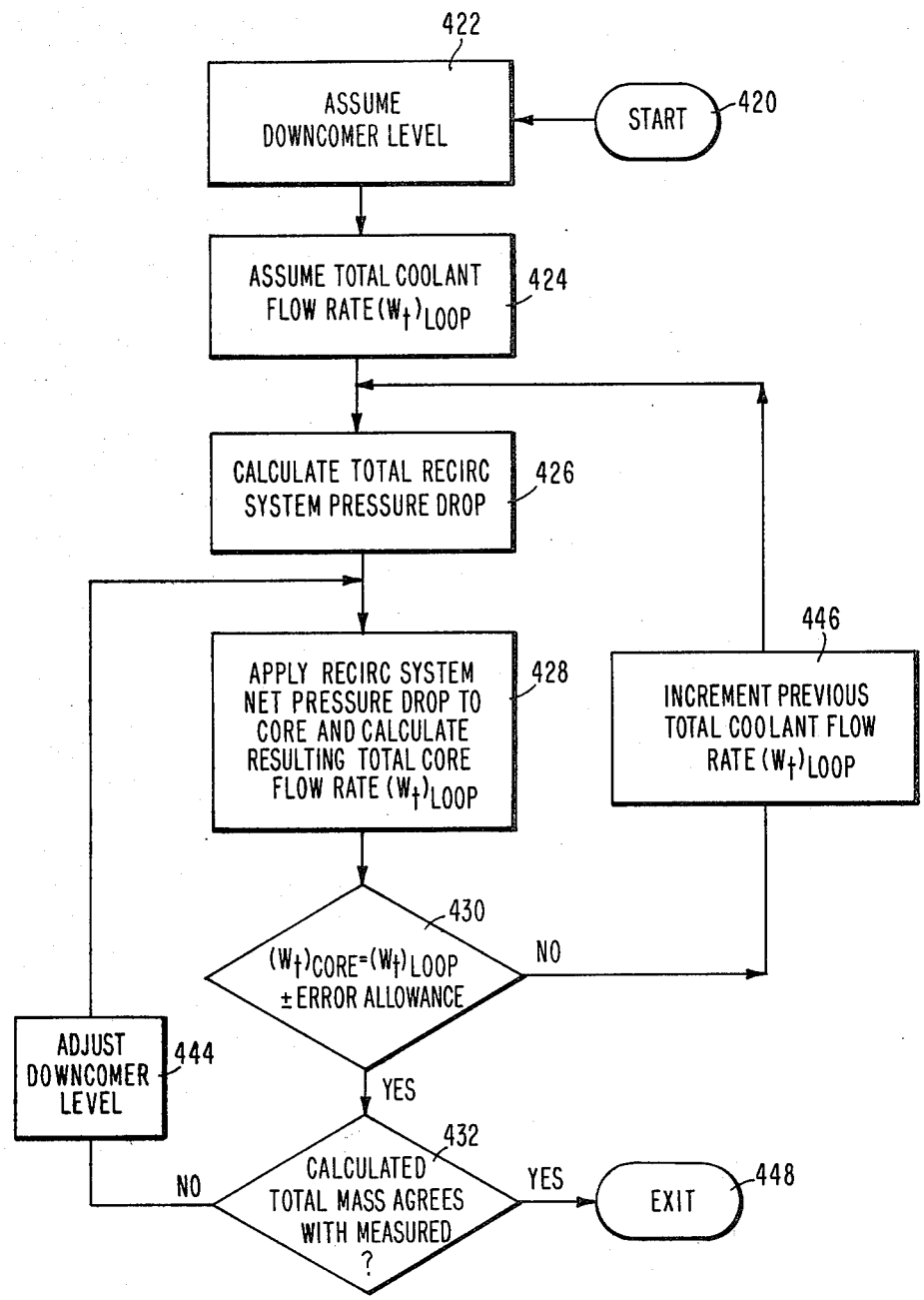

The hydraulics model of the BWR primary system, which is in the thermal-hydraulics subroutine, performs a steady-state analysis of the system recirculation flow. In its natural circulation mode, the model requires as input either the downcomer level and core power, from which it calculates the recirculation flow and system inventory (FIG. 14), or the system inventory and core power from which it calculates the recirculation flow and level in the downcomer (FIG. 15). Thus, it can be used to confirm either the downcomer level measurement from the calculated system inventory or the system inventory using the downcomer level measurement. For all cases, the model assumes that inside the core shroud the system is always full, i.e., the level is at the top of the steam separators (362). This allows the interpreter logic to track inventory up to the point where a two-phase level appears in the upper plenum (358). At this point, operator action to avoid core uncovery will be obvious.

The Analytical Model—Core Cooling (The thermal-hydraulics subroutine)

Core steady-state, thermal-hydraulic analyses are performed using a model of the reactor core, which includes hydraulic descriptions of orifices, lower tie plates, fuel rods, fuel rod spacers, upper tie plates, the fuel channel, and core bypass flow paths. The orifice, lower tie plate, fuel rod spacers, upper tie plate, and, where applicable, holes in the lower tie plate are hydraulically represented as being separate, distinct local losses of zero thickness. The fuel channel cross-section is represented by a square section with enclosed area equal to the unrodded cross-sectional area of the actual fuel channel.

The recirculation loop (flow paths 1 through 6 in FIG. 12) steady-state, thermal-hydraulic analyses are performed using a model which includes the steam separators (362), the internal jet pumps (366), and all measured coolant inflows and outflows. The cross-section of each flow path is a volume average of the variable geometry within the flow path.

The total pressure drop in a flow path (core path or recirculation loop path) is the summation of pressure drops due to friction, local losses, elevation, and acceleration. Each of these pressure drop components is modeled for two-phase and single-phase flow conditions.

Thermal Hydraulics Core Model Inputs

There are three general types of inputs to the thermal-hydraulic model. The first type consists of fixed parameters such as core and recirculation path geometry, pressure-drop factors and core power distribution factors. The pressure-drop factors are chosen such that calculated flows in the forced-flow mode agree with measured flows in startup tests or separate component tests. The second type consists of numerical convergence parameters. These parameters are chosen on the basis of off-line model calculations on a wide variety of system conditions. The third type consists of time varying conditions such as core power, system pressure, reactor vessel inflow and outflow rates, reactor vessel inflow enthalpies, and measured downcomer level. These inputs are determined by the interpreter logic from system measurements and are updated each time the thermal-hydraulic model performs a calculation.

The locations at which the model considers inflows or outflows are shown in FIG. 12. The seven possible system inflow locations are:

1. Feedwater sparger (feedwater and/or HPCI);
2. Bottom of bypass, 372, (CRD cooling flow);
3. Upper plenum, 358, (core spray);
4. Bypass, 370, (LPCI in BWR/5 or BWR/6);
5. Lower plenum, 352, (standby liquid control);
6. Recircultion line, 354, (LPCI in BWR/3 or BWR/4);
7. Top head, 376, (RCIC in BWR/6).

The two possible system outflow locations are:

1. Steam line, 374, (main steam and/or safety/relief valves);
2. Recirculation line, 354, (leakage).

Flow Calculation Process

The flow calculation process must be iterative since pressure drop is not a linear function of coolant flow rate. The recirculation loop analysis iteration scheme for the case in which downcomer level and core power are known is shown in FIG. 14 (blocks 400–412). The process is one of trial and error. First a total coolant flow is assumed (block 402), and the resultant pressure drops are calculated around the recirculation loop (block 404). This calculated pressure drop or rise is then applied across the reactor core and individual fuel and bypass coolant flow rates are calculated (block 406). The individual fuel channel and bypass leakage flow rate are determined such that the core plenum-to-plenum pressure drop through all parallel paths is equal to the recirculation loop pressure rise, within an allowable convergence limit. Following convergence, the total core flow (fuel channels plus bypass) is calculated by summing the component flows (block 406). This flow is then compared to the loop flow that was used to calculate the recirculation loop pressure rise (block 408). If these flows agree within an allowable convergence limit, the calculation is complete. If not, the assumed total coolant flow is incremented (block 412) and the steps 402–408 are repeated until convergence is obtained (block 408).

The recirculation loop analysis iteration for the case in which total fluid mass and core power are known is shown in FIG. 15 (blocks 422–448). The iteration schemes for the two calculation models are very similar, the only difference being the outer iteration on downcomer level (block 444 of FIG. 15) for the case in which the total mass is known and the level must be calculated. The calculation of the recirculation loop pressure drop is straightforward since there are no parallel paths in the analytical model. In a natural circulation mode, the flow in the recirculation pump loop (356, FIG. 12) is assumed to the zero. In a forced flow mode, the pressure rise at the jet pump throat must be input. The calculation of the core flow (blocks 406 and 428 in FIGS. 14 and 15) is more complicated since there are many parallel paths. The individual fuel channel and bypass flow rates result in core plenum-to-plenum pressure drops through all parallel paths equal to the calculated recirculation pressure drop (within an allowable convergence limit).

Fluid properties are calculated from the average flow enthalpy at the node of interest and are based on 1967 International Standard Steam-Water Properties. A void-quality relationship based on a drift flux model is used to account for vapor slip in the core, upper plenum, and steam separators.

The iteration scheme used by the hydraulic model in its natural circulation mode assumes co-current up-flow in both the fuel bundles and bypass. Once the level outside the core shroud can no longer support up-flow in the bypass, the bypass flow is set to zero. This assumption should not greatly affect the calculation of core flow or downcomer level as long as the bypass remains full and without voids. The hydraulic model will continue to calculate natural circulation flow until the downcomer level can no longer support co-current up-flow in the fuel bundles and upper plenum. Beyond this point a two-phase level will exist inside the shroud and the level outside the shroud will probably be somewhere below the top of the active fuel. System natural circulation operation beyond this condition cannot be calculated by the interpreter logic hydraulic model, but once this point is reached in the transient, partial uncovery of the core is imminent and some form of operator action is required to restore system inventory. In terms of the intended use of the interpreter logic, the calculation of the level and inventory up to this point satisfies the requirements of the safety monitor, which is to assist the operator in avoiding system conditions which could yield core damage.

Table 1
PRIMARY OUTPUT DISPLAY
Reactor Scrammed at XX:XX:XX

| Parameter | Trend | Value | Units | Time to Reach Limit |
|---|---|---|---|---|
| Reactor Power | (Increasing)* | XXX | % rated | |
| Reactor Coolant Level above Core | | XXX | Inches above active core | |
| Reactor Coolant Level | (Increasing)* | XXX | Inches/min. | XXX min.*** to top of core |
| Reactor Pressure | | XXXX | Psig | |
| Reactor Pressure | (Increasing)* | XXX | Psi*/min | XXX min.*** to 1350 psia** |
| Reactor Coolant Inventory Net Change | (Increasing)* | XXX, XXX | lb/hour | |
| Containment Pressure | (Increasing)* | XX | Psig/min | XXX min.*** to 60 psia |
| Electrical Loss of Power on: AC Bus ____ , DC Bus ____ , | | | | |
| Loss of pneumatic Air | | | | |
| For further information depress buttons X, X, X, X. | | | | |

*Alternate display (decreasing).
**1550 psia.
***Flashing signal when time is less than 20 minutes.
****Fixed point numbers (not in engineering notation).
NOTE:
Asterisks are for explanation and clarification and not to be displayed on the CRT.

TABLE 2
SECONDARY OUTPUT DISPLAY
System Status Displays (Pushbuttons 1-6):
Pushbutton #1. Reactor Vessel Inflow and Outflow in Ranked Order.

| Parameter | Value | Units |
|---|---|---|
| OUTFLOW: | | |
| a. Main Steam Lines | XX | lb/sec |
| b. Safety Relief Valve No. XX | XX | lb/sec |
| c. RHR | XX | lb/sec |
| d. RCIC Turbine Exhaust | XX | lb/sec |
| e. RWCU | XX | lb/sec |
| f. Leak Detection | XX | lb/sec |
| INFLOW: | | |

TABLE 2-continued

| | | |
|---|---|---|
| a. Feedwater | XX | lb/sec |
| b. HPCS | XX | lb/sec |
| c. LPCS | XX | lb/sec |
| d. RHR | XX | lb/sec |
| e. RCIC | XX | lb/sec |
| f. Standby Liquid Control | XX | lb/sec |
| g. CRD Return | XX | lb/sec |

Pushbutton #2. Status of Reactor Core

| Parameter | Value | Units |
|---|---|---|
| Reactor Scrammed at | XX:XX:XX | Hrs/Min/Sec |
| Current Decay Heat Level | XX | Mwt |
| *Current Power Level | XXX | Mwt |
| Reactor Coolant Level above Core | XX | Inches above Active Core |
| Reactor Pressure | XXXX | Psig |

*Displayed only if reactor did not scram. This statement will replace the Decay Heat Level statement.

Pushbutton #2. System Status Statements
Display

Averaged wide range water level is R × WLW inches using the following transmitter signals:
B22-N026A, G25 inches (print if G30 not equal 0 and G31 not equal 0)
B22-N026B, G26 inches (print if G30 not equal 0 and G32 not equal 0)
B22-N026C, G27 inches (print if G31 not equal 0 and G32 not equal 0)
Reactor water level is below the range of narrow range instruments.

Pushbutton #3. Status of Containment

| Parameter | Value | Units |
|---|---|---|
| Containment Pressure | XX | lb/sec |
| Suppression Pool Water Level | XXX | feet |
| Suppression Pool Water Average Temperature | XXX | °F. |
| Suppression Pool Water Peak Temperature | XXX | °F. |
| *Suppression Pool Water Peak Temperature Rate | XXX | °F./min |
| Coolant Flow into Suppression Pool | XXX | lb/sec |
| Coolant Flow out of Suppression Pool | XXX | lb/sec |
| *Suppression Pool Water Coolant Rate | XX | °F./min |
| Containment Region Hydrogen Concentration | XX | % |
| Containment Region Oxygen Concentration | XX | % |
| Drywell Environmental Temperature | XXX | °F. |

*To be displayed only when rate of change is measured.

Pushbutton #3. System Status Statements
Display

A Main Steam Line isolation signal is present.
SRV A open indication by valve stem position.
SRV B open indication by valve stem position.
SRV C open indication by valve stem position.
SRV D open indication by valve stem position.
SRV E open indication by valve stem position.
SRV F open indication by valve stem position.
SRV G open indication by valve stem position.
SRV H open indication by valve stem position.
SRV J open indication by valve stem position.
SRV K open indication by valve stem position.
SRV L open indication by valve stem position.
SRV M open indication by valve stem position.
SRV N open indication by valve stem position.
SRV P open indication by valve stem position.
SRV R open indication by valve stem position.
SRV S open indication by valve stem position.
SRV U open indication by valve stem position.
SRV V open indication by valve stem position.
SRV A open indication by valve operator position.
SRV B open indication by valve operator position.
SRV C open indication by valve operator position.
SRV D open indication by valve operator position.
SRV E open indication by valve operator position.
SRV F open indication by valve operator position.
SRV G open indication by valve operator position.
SRV H open indication by valve operator position.
SRV J open indication by valve operator position.
SRV K open indication by valve operator position.
SRV L open indication by valve operator position.
SRV M open indication by valve operator position.

TABLE 2-continued

SRN N open indication by valve operator position.
SRV P open indication by valve operator position.
SRV R open indication by valve operator position.
SRV S open indication by valve operator position.
SRV U open indication by valve operator position.
SRV V open indication by valve operator position.

Pushbutton #4.  Status of Makeup Sources*

WATER MAKEUP SYSTEMS-DISABLED:
Feedwater
HPCS
LPCS
RHR
RCIC
Standby Liquid Control
Control Rod Drive Cooling

WATER MAKEUP SYSTEMS-NORMAL:
Feedwater
HPCS
LPCS
RHR
RCIC
Standby Liquid Control
Control Rod Drive Cooling

SYSTEM STATUS STATEMENTS
Displays

Valve 5-4V22 is open and feedwater is being bypassed to the condenser.
SLC Pump A motor breaker disconnected.
SLC Pump B motor breaker disconnected.
RHR Pump A motor breaker disconnected.
RHR Pump B motor breaker disconnected.
RHR Pump C motor breaker disconnected.

| | |
|---|---|
| RHR Loop A: | Incorrect valve lineup; pump discharge is lined up for LPCI; suction is lined up for shutdown cooling. |
| RHR Loop B: | Incorrect valve lineup; pump discharge is lined up for LPCI; suction is lined up for shutdown cooling. |

RHR Seawater to RHR Loop B connection valves are open, and the Loop B is lined up for flooding the reactor with seawater.
Seawater injection into the reactor is (WVLC3) lb/sec.
Combined seawater and suppression pool water into the reactor is (WVLC1B) lb/sec.
Seawater injection rate into the reactor cannot be determined because RHR Pump B is operating and valve E12-F068B is not closed.

| | |
|---|---|
| RHR Loop A: | Incorrect valve lineup; pump discharged lined up for shutdown cooling; pump suction lined up for LPCI. |
| RHR Loop B: | Incorrect valve lineup; pump discharge lined up for shutdown cooling; pump suction lined up for LPCI. |
| RHR Loop A: | Reactor water is draining to the pool through the minimum flow bypass line. |
| RHR Loop B: | Reactor water is draining to the pool through the minimum flow bypass line. |
| RHR Loop A: | Incorrect valve lineup; pump discharge lined up for head spray; pump suction lined up for LPCI. |
| RHR Loop A: | Incorrect lineup; pump discharge in lineup to the suppression pool through the heat exchanger condensing mode condensate line; pump suction is lined up for shutdown cooling; reactor coolant is flowing into the suppression pool. |
| RHR Loop B: | Incorrect lineup; pump discharge in lineup to the suppression pool through the heat exchanger condensing mode condensate line; pump suction is lined up for shutdown cooling; reactor coolant is flowing into the suppression pool. |

Reactor coolant is flowing to the radwaste collector tank through valves E12-F040 and E12-F049.
Reactor coolant is flowing to the suppression pool through the RHR A heat exchanger vent valves.
Reactor coolant is flowing to the suppression pool through the RHR B heat exchanger vent valves.

| | |
|---|---|
| RHR Loop A: | Incorrect lineup; pump suction is from the reactor shutdown line; discharge is through the test line or the containment/suppression pool spray line; reactor coolant is flowing into the drywell or suppression pool. |
| RHR Loop B: | Incorrect lineup; pump suction is from the reactor shutdown line; discharge is through the test line or the containment/suppression pool spray line; reactor coolant is flowing into the drywell or suppression pool. |

Incorrect valve lineup; the RHR shutdown line is open and Loop A or B suction line from the suppression pool is open; reactor coolant flowing into the suppression pool.
LPCS minimum flow bypass valve is open.
LPCS valve lineup incorrect for injection.
LPCS pump motor breaker disconnected.
HPCS minimum flow bypass valve open
HPCS valve lineup for injection is incorrect.
HPCS pump motor breaker disconnected.
There is an RCIC isolation signal.
The RCIC is inoperable; check the position of valves E51-F012, E51-F022, E51-F059, E51-F068, E51-F063, and E51-F064.
The RCIC turbine has been tripped by the mechanical overspeed mechanism; it must be reset locally.
RWCU blowdown to main condenser, waste collector or waste surge tank is occurring.

*Systems will be displayed only under one heading (i.e., either Disabled or Normal), at a given point in time.

Pushbutton #5.  Status of Instrumentation

System Status Statements
Displays

The three methods of calculating main steam flow do not agree within K20 psi. Main steam flow is being calculated by averaging the following methods:
Measured steam flow, G13 lb/sec (print if G20 not equal 0 and G22 not equal 0)
Turbine first stage pressure, G15 lb/sec (print if G20 not equal 0 and G21 not equal 0)
Generator output, G18 lb/sec (print if G21 not equal 0 and G22 not equal 0)
Feedwater measured by nozzles in reactor feedwater line and flow measured at reactor feed pump suction lines disagree by G6 lb/sec.
Both wide range level transmitter signals B22-N026A and B22-N026C do not indicate within K26 to K25 inches. A power failure may exist. Wide range level transmitter B22-N026B is being used.
Narrow range and wide range water level indication differs by G54 inches. Narrow range value is being used.
Reactor Water Level is below the range of narrow range instruments.
Narrow range reactor water level instruments do not agree with K6 psi.
Wide range and fuel zone water level indication differs by G46 inches. Wide range value is being used.
Both Turbine first stage pressure and condenser pressure current input signals are less than K30 mA or greater than K31 mA. A common mode power supply failure may exist. The total steam flow signal is being used.
The reactor pressure indicators do not agree within K3 psi.
The reactor pressure indicators do not agree within K4 psi.
Reactor pressure is being calculated by averaging the following pressure transmitter signals:
B22N051A (G5 not equal 0 and G7 not equal 0)
B22N051B (G5 not equal 0 and G6 not equal 0)
C34N005 (G6 not equal 0 and G7 not equal 0)
Both reactor pressure transmitter signals B22-N051B and C34-N005 do not indicate within K14 to K15 psig. A common power supply failure may exist. Reactor pressure transmitter B22-N051A is being used.
SRV A valve stem and operator position indication disagree.
SRV B valve stem and operator position indication disagree.
SRV C valve stem and operator position indication disagree.
SRV D valve stem and operator position indication disagree.
SRV E valve stem and operator position indication disagree.
SRV F valve stem and operator position indication disagree.
SRV G valve stem and operator position indication disagree.
SRV H valve stem and operator position indication disagree.
SRV J valve stem and operator position indication disagree.
SRV K valve stem and operator position indication disagree.
SRV L valve stem and operator position indication disagree.
SRV M valve stem and operator position indication disagree.
SRV N valve stem and operator position indication disagree.
SRV P valve stem and operator position indication disagree.
SRV R valve stem and operator position indication disagree.
SRV S valve stem and operator position indication disagree.
SRV U valve stem and operator position indication disagree.

TABLE 2-continued

SRV V valve stem and operator position indication disagree.
There is a scram signal, but the APRMs selected for input to
the process computer do not indicate less than 1% power.
The CRD cooling flowmeter indicates flow, but the pressure
control valve C12-F003 is closed.
SLC measured and calculated flows disagree.
HPCS measured flow and calculated flows disagree by G8 lb/sec.

| | |
|---|---|
| RHR B | flowmeter does not indicate flow, but the panel indicating light shows RHR pump B is running. Also, pressure switch E12-N022B is indicating low discharge pressure. The interpreter logic is assuming the flowmeter is correct. |
| RHR C | flowmeter does not indicate flow, but the panel indicating light shows RHR pump C is running, Also, pressure switch E12-N022C is indicating low discharge pressure. The interpreter logic is assuming the flowmeter is correct. |
| RHR A | flowmeter does not indicate flow, but the panel indicating light shows RHR pump A is running. Also, pressure switch E12-N022A is indicating that pump discharge pressure is in the normal operating range. The interpreter logic is assuming the flow is equal to pump minimum flow of (K9) lb/sec. |
| RHR B | flowmeter does not indicate flow, but the panel indicating light shows RHR pump B is running. Also, pressure switch E12-N022B is indicating that pump discharge pressure is in the normal operating range. The interpreter logic is assuming the flow is equal to pump minimum flow of (K9) lb/sec. |
| RHR C | flowmeter does not indicate flow, but the panel indicating light shows RHR pump C is running. Also, pressure switch E12-N022C is indicating that pump discharge pressure is in the normal operating range. The interpreter logic is assuming the flow is equal to pump minimum flow of (K9) lb/sec. |
| RHR A | flowmeter indicates flow, and RHR pump A is running. However, a high or low pump discharge pressure signal from E12-N022A exists. |
| RHR B | flowmeter indicates flow, and RHR pump B is running. However, a high or low pump discharge pressure signal from E12-N022B exists. |
| RHR C | flowmeter indicates flow, and RHR pump C is running. However, a high or low pump discharge pressure signal from E12-N022C exists. |
| RHR A | flowmeter indicates flow, and E12-N022A shows pump discharge pressure to be within operating range. However, the panel indicating light does not show that RHR pump A is running. |
| RHR B | flowmeter indicates flow, and E12-N022B shows pump discharge pressure to be within operating range. However, the panel indicating light does not show that RHR pump B is running. |
| RHR C | flowmeter indicates flow, and E12-N022C shows pump discharge pressure to be within operating range. However, the panel indicating light does not show that RHR pump C is running. |
| RHR A | flowmeter indicates flow. However, pump discharge pressure is low, and the panel indicating light does not show that RHR pump A is running. The interpreter logic assumes flow is zero. |
| RHR B | flowmeter indicates flow. However, pump discharge pressure is low, and the panel indicating light does not show that RHR pump B is running. The interpreter logic assumes flow is zero. |
| RHR C | flowmeter indicates flow. However, pump discharge pressure is low, and the panel indicating light does not show that RHR pump C is running. The interpreter logic assumes flow is zero. |
| RHR A | flowmeter does not indicate flow, but the panel indicating light shows RHR pump A is running. Also, pressure switch E12-N022A is indicating low discharge pressure. the interpreter logic is assuming the flowmeter is correct. |

Pushbutton #6.   Status of Auxiliary Support System
System Status Statements
                                    Displays Loss of Instrument Air, A
Loss of Instrument Air, B
Loss of Essential Bus #1
Loss of Essential Bus #2
Loss of Essential Bus #3
Loss of DC Bus A
Loss of DC Bus B
Loss of Auxiliary Power Bus A
Loss of Auxiliary Power Bus B
RHR Seawater pump A motor breaker disconnected
RHR Seawater pump B motor breaker disconnected
RHR Seawater pump C motor breaker disconnected
RHR Seawater pump D motor breaker disconnected

GRAPHICAL DISPLAYS

Pushbuttons 7-11 are for the graphical trend displays.
The following graphical displays are available for
selection by the operator:

Pushbutton #7.   Reactor Coolant Level
Range: 2 feet below active core to 2 feet above level 8.
Time Range: 15 min., 1 hr., 2 hr., 4 hr,
Different color on level trace above and below the top of
active core.

Pushbutton #8.   Reactor Pressure
Range: 0 to 1400 psia
Time Scale: 15 min., 1 hr., 2 hr., 4 hr.
Different color on level trace above 1150 psia.

Pushbutton #9.   Reactor Power
Range: 0 to 110% power.
Time scale: 1 min., 10 min., 1 hr., 2 hr.

Pushbutton #10.   Containment Pressure
Range: 0 to 70 psia
Time Range: 15 min., 2 hr., 4 hr., 12 hr.
Different color for pressure above 60 psia.

Pushbutton #11.   Reactor Coolant Inventory Net Flow
Range: 10,000 (out)–0–10,000 (in) gpm
Time Range: 15 min., 1 hr., 2 hr., 4 hr.
Different colors are to be used for (in) and (out) flows.

TABLE 3

RHR SYSTEM FLOW PATHS (VALVE LINEUPS)

Pump Discharge Valve Lineups

| | | |
|---|---|---|
| Lineup 1 | Around or through heat exchanger (P1) | |
| | Open if valves (E12-F003 and E12-F047) are open or valve E12-F048 is not closed. Separate calculations for Loop A and Loop B. | |
| Lineup 2 | LPCI (P2) | |
| | Open if valves (E12-F042 and E12-092) are open and valve E12-F041 is not closed. Separate calculations for Loop A, Loop B and Loop C. | |
| Lineup 3 | Shutdown Cooling (P3) | |
| | Open if valve E12-F090 is open. Separate calculations for Loop A and Loop B. | |
| Lineup 4 | Test Line (P4) | |
| | Open if valve E12-F024 is open. Calculate separately for Loop A and Loop B. Loop C - open if valve E12-F021 is open. | |
| Lineup 5 | Pump Minimum Flow (P5) | |
| | Open if valve E12-F064 is open. Calculate for Loop A, Loop B, and Loop C. | |
| Lineup 6 | Drywell/Suppression Pool Spray (P6) | |
| | Open if valves (E12-F016 and E12-F017) or valve E12-F027 are open. Calculations for Loops A and B are required. | |
| Lineup 7 | Vessel Head Spray Line (Pump A Only) (P7) | |
| | Open if valves E12-F023 and E51-F066 are open. | |

Pump Suction Valve Lineups

| | | |
|---|---|---|
| Lineup 8 | From Suppression Pool (P8) | |
| | Open if valve E12-F004 is open. Calculate for Loop A and Loop B. Open if valve E12-F004C is open for Loop C. | |
| Lineup 9 | From Reactor (P9) | |
| | Open if valves E12-F009 and E12-F091 are open. In addition, valve E12-F006A for Loop A or E12-F006B for Loop B must be open. | |

Other Valve Lineups

| | | |
|---|---|---|
| Lineup 10 | Heat Exchanger to Suppression Pool (P10) | |
| | Open if pneumatic valve F12-F065 is not closed and valve E12-F011 is open. Calculate for Loop A and Loop B. | |
| Lineup 11 | Service Water Injection (P11) | |
| | Open if valves E12-F093 and E12-F094 are open. | |

TABLE 3-continued
RHR SYSTEM FLOW PATHS (VALVE LINEUPS)

(Loop B only).
Lineup 12  Reactor Steam to Heat Exchanger (P12)
Open if both valve E51-F063 and E51-F064 and either valves E12-F051 and E12-F052 or valve E12-F087 are not closed. Calculate for both Loop A and Loop B.
Lineup 13  Loop A to Radwaste Collector Tank (P13)
Open if valve E12-F039 is open and valve E12-F040 is not closed.
Lineup 14  RHR Heat Exchanger Vent (P14)
Open if valve E12-F073 and E12-F074 are not closed. Calculate for Loop A and Loop B.

NOTE:
The valve designations shown in this table are for a specific plant. They are used here as an example.

TABLE 4
VALVE LINEUP COMBINATIONS

| Valve Lineup Combination | Loops | Description | Notes |
|---|---|---|---|
| 1 P1 + P2 + P8 | A,B,C | LPCI injection<br>Flow Measurement: FT<br>Flow Direction: in | |
| 2 P2 + P3 + P9 | A,B | LPCI valving in discharge, suction from reactor | Alarm, incorrect valve lineup |
| 3 P2 + P11 | B | Reactor fill with water<br>Flow Measurement: FT<br>Flow Direction: in | Alarm |
| 4 P1 + P3 + P8 | A,B | LPCI injection to recirc lines<br>Flow Measurement: FT<br>Flow Direction: in | Alarm |
| 5 P1 + P3 + P9 | A,B | Shutdown cooling<br>Flow Measurement: 0 | |
| 6 P3 + P11 | B | Reactor fill with service water<br>Flow Measurement: Same as Combination 3<br>Flow Direction: in | Alarm |
| 7 P1 + P4 + P8 | A,B,C | Pump test<br>Flow Measurement: 0 | |
| 8 P1 + P4 + P9 | | Reactor blowdown to pool<br>Flow Measurement: FT<br>Flow Direction: out | Alarm |
| 9 P1 + P4 + P11 | B | Postaccident containment flood with service water<br>Flow Measurement: 0 | Change suppression pool inventory |
| 10 P5 + P9 | A or B | Pump bypass open, draining down reactor<br>Flow Measurement:<br>W = f (orifice, P, T)<br>Flow Direction: out | Alarm |
| 11 P1 + P6 + P8 | A,B | Containment spray<br>Flow Measurement: FT | |
| 12 P1 + P6 + P9 | A or B | Reactor blowdown<br>Flow Measurement: FT with 2 phase flow correction<br>Flow Direction: out | Alarm |
| 13 P1 + P6 + P11 | B | Containment flooding<br>Flow Measurement: Same as Combination 3 | |
| 14 P1 + P7 + P8 | A | Reactor fill from pool<br>Flow Measurement: FT<br>Flow Direction: in | |

TABLE 4-continued
VALVE LINEUP COMBINATIONS

| Valve Lineup Combination | Loops | Description | Notes |
|---|---|---|---|

NOTE:
FT = Flow transmitter.
Flow Direction: In - into reactor pressure vessel; Out - out of reactor pressure vessel.

While the invention has been particularly shown and described with reference to a preferred embodiment thereof, it will be understood by those skilled in the art that various changes in form and details may be made therein without departing from the spirit and scope of the invention.

We claim:

1. For use in a nuclear reactor power plant, including a reactor vessel having a reactor core, said power plant having a number of first subsystems utilized for operating said plant during normal operating conditions, a number of second subsystems utilized for operating said plant during abnormal and accident operating conditions, and a control panel for displaying plant parameters relating to plant operation, said first and second subsystems including subsystems that add water to said reactor vessel, and subsystems that take water away from said reactor vessel, a transient interpreter comprising:

A. means (36) connected to said first and second subsystems for receiving signals representing the values of various ones of said plant parameters;

B. interpreter logic means (22) responsive to said receiving means (36) for analyzing said ones of said plant parameters, said interpreter logic means including:

means for determining the instantaneous water inventory of said reactor vessel by monitoring the parameters of those of said first and second subsystems that add water to said reactor vessel, and those of said first and second subsystems that take water away, to provide first data corresponding to the net inflow or outflow of water to said reactor vessel as indicated by directly measured process instrumentation level meters;

means for converting said first data to measured water level data relative to the top of said reactor core;

back-up system means for calculating reactor vessel water level based upon an analytical model of said reactor vessel and said core, said analytical model being based upon the integration of the inflow and outflow of water to said reactor vessel, reactor power, reactor pressure, and reactor water mass, to thereby provide calculated water level data as an alternate to said measured water level data;

means for setting said calculated water level data to be equal to said measured water level data, so that said calculated water level is consistent with said measured water level data as indicated by said directly measured process instrumentation level meters, said means for setting being operative periodically only during normal operation of said plant;

C. first means (14) responsive to said interpreter logic means (22) for generating for display, a primary display, said primary display comprised of information corresponding to primary parameters, said primary parameters comprising a first subset of said plant parameters, said first subset of said plant parameters relating to said first subsystems utilized for operating said plant during normal operating conditions;

D. second means (18, 20) responsive to said interpreter logic means (22) for generating for display, a plurality of secondary displays, each of said secondary displays comprised of information corresponding to secondary parameters, said secondary parameters comprising a second subset of said plant parameters relating to said second subsystems utilized for operating said plant during abnormal and accident operating conditions, said second means including third means (310) responsive to said determining means within said interpreter logic means (22) for generating a first one of said plurality of secondary displays, said first one secondary display comprised of said calculated water level data; and, E. fourth means (16, 32, 34) connected to said first means (14) and to said second means (18, 20), said fourth means being selectively operable by an operator, for selecting for display any one of said secondary displays, including said first one of said secondary displays, from said plurality of secondary displays.

2. The combination in accordance with claim 1 wherein said interpreter logic means further comprises:
 fifth means for determining the instantaneous power level; and,
 sixth means for determining whether or not the reactor is reaching the containment pressure limit that will rupture said containment vessel;
 said first means (14) further including seventh means responsive to said determining means within said interpreter logic means (22), and to said fifth, and sixth means, for generating for display, a primary display, said primary display comprised of information corresponding to said instantaneous water inventory of said reactor vessel, said instantaneous power level, and information as to whether or not the reactor is reaching the containment pressure limit that will rupture the containment vessel.

3. For use in a nuclear reactor power plant, including a reactor vessel, said power plant having a number of first subsystems utilized for operating said plant during normal operating conditions, a number of second subsystems utilized for operating said plant during abnormal and accident operating conditions, and a control panel for displaying plant parameters relating to plant operation, a transient interpreter comprising:
 means (22) for logically combining critical ones of said plant parameters to thereby provide data as to normal, abnormal and accident plant conditions;
 first means (14), responsive to said combining means (22), for generating a primary output display comprised of primary output display (POD) data, said POD data containing information in summary form of selected ones of said critical plant parameters, said selected ones of said critical plant parameters comprising a first subset of said plant parameters, said first subset of said plant parameters relating to said first subsystems utilized for operating said plant during normal operating conditions said POD data including measured data corresponding to the net inflow or outflow of water to said reactor vessel as indicated by directly measured process instrumentation level meters;
 displaying means (9, 10, 11) for displaying data inputted thereto;
 second means (26) connected to said first means (14) and to said displaying means (9, 10, 11) for gating said primary output display, selectively under control of a first selection input (17), to said displaying means (9, 10, 11);
 third means (18) responsive to said combining means (22) for generating a plurality of secondary output displays (19),
 said third means including means for calculating reactor vessel water level based upon an analytical model of said reactor vessel and said core, said analytical model being based upon the integration of the inflow and outflow of water to said reactor vessel, reactor power, reactor pressure, and reactor water mass, to thereby provide calculated water level data,
 said secondary output displays (19) comprised of secondary output display (SOD) data, said SOD data comprising a second subset of said plant parameters relating to said second subsystems utilized for operating said plant during abnormal and accident operating conditions, said SOD data containing information in summary form of said second subset of said plant parameters, said SOD data including said calculated water level data which provides an operator with a secondary display during abnormal and accident operating conditions which is an alternative to said measured data available on said primary output display;
 fourth means (34) connected to said third means (18) and to said displaying means (9, 10, 11) for gating one of said secondary output displays (19), selectively under control of a corresponding one of said second selection inputs (28), to said displaying means; and,
 fifth means (16) operable by an operator, for selectively energizing and deenergizing said second selection inputs (28) and said first selection input (17) to thereby provide said operator with a display of only selected ones of said second subset of said plant parameters.

4. The combination in accordance with claim 3, wherein said fifth means (16) operable by an operator, for selectively energizing and deenergizing said second selection inputs (28) includes a number of pushbuttons, each of said number of pushbuttons being associated with a corresponding one of said second selection inputs (28), and said POD data includes at least one prompt message for display to thereby inform an operator as to which of said number of pushbuttons to press in order to call up the corresponding one of said secondary displays for viewing.

5. For use in a nuclear reactor power plant, including a reactor vessel, said power plant having a number of first subsystems utilized for operating said plant during normal operating conditions, a number of second subsystems utilized for operating said plant during abnormal and accident operating conditions, and a control panel for displaying plant parameters relating to plant operation, said plant including a water-cooled reactor core in a reactor vessel, the method comprising the steps of:

A. generating primary information as to whether the core is covered and likely to remain covered, including information as to the status of those of said first and second subsystems needed to provide water to cool the core and maintain core integrity;

said step of generating primary information including the steps of:

determining the instantaneous water inventory of said reactor vessel by monitoring the parameters of those of said first and second subsystems that add water to said reactor vessel, and those of said first and second subsystems that take water away, to provide first data corresponding to the net inflow or outflow of water to said reactor vessel as indicated by directly measured process instrumentation level meters;

converting said first data to measured water level data relative to the top of said reactor core; and, generating for display, a primary display, said primary display comprised of information corresponding to said instantaneous water inventory of said reactor vessel;

B. generating secondary information which provides a secondary display comprised of information as to reactor vessel water inflow and outflow in ranked order which can be viewed selectively for more detailed information when an abnormal condition occurs;

said step of generating secondary information including the steps of:

calculating reactor vessel water level based upon an analytical model of said reactor vessel and said core, said analytical model being based upon the integration of the inflow and outflow of water to said reactor vessel, reactor power, reactor pressure, and reactor water mass, to thereby provide calculated water level data as an alternate to said measured water level data;

setting said calculated water level data to be equal to said measured water level data periodically only during normal operation of said plant, so that said calculated water level is consistent with said measured water level data as indicated by said directly measured process instrumentation level meters; and, C. displaying with said primary information, a prompt message indicating that said secondary display should be selected for viewing.

6. The method in accordance with claim 5 wherein said step B of generating secondary information includes the further step of performing a thermal-hydraulic analysis in order to generate secondary information for display as to whether the water level is rising or dropping, and how much time remains before the core will become uncovered if the water level continues to drop at its current rate.

* * * * *